US009813318B2

(12) United States Patent
Iyoob et al.

(10) Patent No.: US 9,813,318 B2
(45) Date of Patent: Nov. 7, 2017

(54) ASSESSMENT OF BEST FIT CLOUD DEPLOYMENT INFRASTRUCTURES

(71) Applicant: Gravitant, Inc., Austin, TX (US)

(72) Inventors: Ilyas Iyoob, Pflugerville, TX (US); Aaron Michael Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 120 days.

(21) Appl. No.: 14/817,303

(22) Filed: Aug. 4, 2015

(65) Prior Publication Data

US 2015/0341240 A1 Nov. 26, 2015

Related U.S. Application Data

(63) Continuation-in-part of application No. 14/199,956, filed on Mar. 6, 2014, which is a continuation-in-part of application No. 14/140,443, filed on Dec. 24, 2013.

(60) Provisional application No. 61/789,865, filed on Mar. 15, 2013, provisional application No. 61/790,536, filed on Mar. 15, 2013, provisional application No. 61/792,998, filed on Mar. 15, 2013, provisional application No. 61/798,567, filed on Mar. 15, 2013, (Continued)

(51) Int. Cl.

| | |
|---|---|
| *G06Q 40/00* | (2012.01) |
| *G06Q 30/06* | (2012.01) |
| *G06Q 10/06* | (2012.01) |
| *G06F 9/455* | (2006.01) |
| *H04L 29/08* | (2006.01) |
| *H04L 12/26* | (2006.01) |
| *H04L 12/24* | (2006.01) |
| *G06F 9/445* | (2006.01) |

(52) U.S. Cl.
CPC ............... *H04L 43/08* (2013.01); *G06F 8/60* (2013.01); *G06Q 10/06* (2013.01); *G06Q 30/0629* (2013.01); *G06Q 30/0631* (2013.01); *G06Q 40/00* (2013.01); *H04L 41/5054* (2013.01); *H04L 67/1097* (2013.01); *G06F 9/45558* (2013.01); *H04L 41/145* (2013.01); *H04L 43/062* (2013.01); *H04L 67/10* (2013.01); *H04L 67/16* (2013.01)

(58) Field of Classification Search
None
See application file for complete search history.

(56) References Cited

U.S. PATENT DOCUMENTS

| 2009/0086945 | A1* | 4/2009 | Buchanan | ......... H04M 3/42289 379/201.02 |
|---|---|---|---|---|
| 2010/0125473 | A1* | 5/2010 | Tung | ..................... G06F 9/5072 709/200 |

(Continued)

*Primary Examiner* — Philip Chea
*Assistant Examiner* — Hassan Khan
(74) *Attorney, Agent, or Firm* — David O. Simmons; IVC Patent Agency

(57) ABSTRACT

A system configured to facilitate brokering hybrid cloud services selects information requests for characterizing an information technology application. The system responses to the information requests and determines a plurality of sets of the responses each used for deriving a value of a respective one of a plurality of factor functions. The system determines a plurality of assessment results each derived using values for of a respective set of the factor functions. Each one of the assessment results characterizes a respective aspect of deploying the information technology application within a cloud environment.

16 Claims, 26 Drawing Sheets

Related U.S. Application Data provisional application No. 61/938,660, filed on Feb. 11, 2014.

(56) References Cited

U.S. PATENT DOCUMENTS

| | | | |
|---|---|---|---|
| 2011/0276686 A1* | 11/2011 | Tung | G06F 9/5072 709/224 |
| 2012/0066018 A1* | 3/2012 | Piersol | G06Q 10/10 705/7.14 |
| 2012/0124211 A1* | 5/2012 | Kampas | G06F 9/50 709/226 |
| 2013/0060945 A1* | 3/2013 | Allam | G06F 9/5072 709/226 |
| 2013/0067090 A1* | 3/2013 | Batrouni | H04L 67/1097 709/226 |
| 2014/0229607 A1* | 8/2014 | Jung | H04L 43/0876 709/224 |

* cited by examiner

ASSESSMENT OF BEST FIT CLOUD DEPLOYMENT INFRASTRUCTURES

CROSS REFERENCE TO RELATED APPLICATIONS

This non-provisional patent application is a continuation-in-part that claims priority from the co-pending U.S. non-provisional patent application having Ser. No. 14/199,956 filed Mar. 6, 2014 entitled "ASSESSMENT OF BEST FIT CLOUD DEPLOYMENT INFRASTRUCTURES", having a common applicant herewith, and being incorporated herein in its entirety by reference.

U.S. non-provisional patent application having Ser. No. 14/199,956 is a continuation-in-part that claims priority from the co-pending U.S. non-provisional patent application having Ser. No. 14/140,443 filed Dec. 24, 2013 entitled "ASSESSMENT OF BEST FIT CLOUD DEPLOYMENT INFRASTRUCTURES", having a common applicant herewith, and being incorporated herein in its entirety by reference.

U.S. non-provisional patent application having Ser. No. 14/199,956 claims priority from the U.S. provisional patent application having Ser. No. 61/938,660 filed Feb. 11, 2014 entitled "ASSESSMENT OF BEST FIT CLOUD DEPLOYMENT INFRASTRUCTURES", having a common applicant herewith, and being incorporated herein in its entirety by reference.

U.S. non-provisional patent application having Ser. No. 14/199,956 claims priority from the U.S. provisional patent application having Ser. No. 61/789,865 filed Mar. 15, 2013 entitled "SYSTEMS, METHODS AND COMPUTER READABLE MEDIUMS FOR IMPLEMENTING CLOUD SERVICE BROKERAGE PLATFORM FUNCTIONALITIES", having a common applicant herewith, and being incorporated herein in its entirety by reference.

U.S. non-provisional patent application having Ser. No. 14/199,956 claims priority from the U.S. provisional patent application having Ser. No. 61/790,536 filed Mar. 15, 2013 entitled "CLOUD SERVICE BROKERAGE (CSB) PLATFORM ARCHITECTURE/PORTAL USE CASE IMPLEMENTATIONS", having a common applicant herewith, and being incorporated herein in its entirety by reference.

U.S. non-provisional patent application having Ser. No. 14/199,956 claims priority from the U.S. provisional patent application having Ser. No. 61/792,998 filed Mar. 15, 2013 entitled "CLOUD SERVICE BROKERAGE (CSB) PLATFORM PORTAL AND CSB PLATFORM ARCHITECTURE FOR PROVIDING SAME", having a common applicant herewith, and being incorporated herein in its entirety by reference.

U.S. non-provisional patent application having Ser. No. 14/199,956 claims priority from the U.S. provisional patent application having Ser. No. 61/798,567 filed Mar. 15, 2013 entitled "SYSTEM, METHODOLOGY, AND COMPUTER READABLE MEDIUM FOR PROVIDING CLOUD SERVICE BROKERAGE (CSB) PLATFORM FUNCTIONALITIES", having a common applicant herewith, and being incorporated herein in its entirety by reference.

FIELD OF THE DISCLOSURE

The disclosures made herein relate generally to cloud computing architectures and management methodologies and, more particularly, to assessing considerations (e.g., readiness and benefit) relating to assessment of best fit hybrid cloud deployment infrastructures.

BACKGROUND

Cloud computing refers to the practice of using a network of remote servers hosted on a public network (e.g., the Internet) to deliver information computing services (i.e., cloud services) as opposed to doing so on a local server. The network architecture (e.g., virtualized information processing environment comprising hardware and software) through which these cloud services are provided to service consumers (i.e., a cloud service consumers) is referred to as "the cloud", which can be a public cloud (e.g., cloud services provided publicly to cloud service consumers) or a private cloud (e.g., a private network or data center that supplies cloud services to only a specified group of cloud service consumers within an enterprise), or a community cloud (e.g., a set of cloud services provided publicly to a limited set of cloud service consumers, e.g., to agencies with a specific State/Region or set of States/Regions), dedicated/hosted private cloud, or other emerging cloud service delivery models. The underlying intent of cloud computing is to provide easy, scalable access to computing resources and information technology (IT) services to cloud service consumers.

Cloud services can be broadly divided into four categories: Infrastructure-as-a-Service (IaaS), Platform-as-a-Service (PaaS), Software-as-a-Service (SaaS), and Managed Services. Infrastructure-as-a-Service refers to a virtualized computing infrastructure through which cloud services are provided (e.g., virtual server space, network connections, bandwidth, IP addresses, load balancers, etc). Platform-as-a-Service in the cloud refers to a set of software and product development tools hosted on the cloud for enabling developers (i.e., a type of cloud service consumer) to build applications and services using the cloud. Software-as-a-Service refers to applications that are hosted on and available on-demand by cloud service consumers via the cloud. Managed Services refers to services such as backup administration, remote system administration, application management, security services, etc. that are enabled by managed service providers for any cloud services.

In general, a cloud service has three distinct characteristics that differentiate it from a traditionally hosted service. The first one of these distinct characteristics is that it is sold to a services consumer on demand (e.g., by the minute or the hour). The second one of these distinct characteristics is that it is dynamic (e.g., a services consumer can have as much or as little of a service as they want at any given point in time). The third one of these distinct characteristics, which applies specifically to public clouds as opposed to private or hybrid clouds, is that the service is fully managed by a cloud services provider (e.g., the services consumer only needs a suitably equipped client device and network connection). This third functionality is particularly relevant to public clouds. However, private clouds can be managed by an internal IT department or through ITO (IT Outsourcing) contracts. In these examples, I&O (Infrastructure & Operations) administrators act as the cloud provider and, accordingly, this third functionality would be of similar relevance.

The cloud is rapidly being adopted by business and IT users as a way to make their organizations more effective and to save costs. Along with this opportunity comes a new set of pain points and significant risks to enterprises that must be addressed. For example, business users are rapidly investing in their own cloud capabilities (e.g., IaaS, PaaS, and SaaS) to meet business needs while application developers want to move rapidly without the involvement of IT to provision tools and environments. These actions are creating a significant threat to IT management whom are worried about considerations such as, for example, managing costs, chargeback, capacity and resources from the result of unrestrained/unplanned cloud expansion.

FIG. 1 shows an example of a traditional cloud management model 100 leading to business unit cloud service users 105 and IT organization cloud service users 108 (i.e., cloud service users) of a cloud service consumer 110 (e.g., a business, an institution, an individual or the like) directly implementing cloud services via cloud service providers 115 (e.g., IaaS, PaaS, SaaS, ERP, and MS available on one or more outside networks) without oversight and/or involvement of a centralized resource (e.g., IT management). ERP refers to enterprise resource planning and MS refers to Managed Services such as security, backup, monitoring and governance services offered by cloud service providers or a CSB platform provider (i.e., the entity that manages and administers the CSB platform). Examples of the cloud service categories include, but are not limited to, enterprises resource planning services, Infrastructure as-a-Service (IaaS), Platform-as-a-Service (PaaS), Software-as-a-Service (SaaS), and managed services.

There are numerous challenges and limitations in regard to implementing and managing cloud services that arise from the traditional cloud management model 100 discussed above in reference to FIG. 1. Examples of these challenges and limitations include, but are not limited to, different portions (e.g., user, entities, departments, etc) of a given cloud service consumer individually buying cloud services; different portions of a given cloud service consumer purchasing cloud services at different price points from the same cloud services provider; actions of different portions of a given cloud service consumer creating gaps in current business entity processes; disparate billing, payment, contract and settlement process for cloud services of a given cloud service consumer being created; IT interests of a given cloud service consumer being required to undertake actions such that it mimic a cloud service provider; existence of inconsistent service management and service-level-agreement (SLA) compliance across cloud service providers; and loss of effectiveness in implementing and managing cloud services due to broken processes across business, IT demand and supply organizations.

Accordingly, underlying problems that exists in cloud computing is that the need for intermediaries to aggregate, integrate or customize cloud services and that this need grows significantly as the number of cloud services and the rate of consumer adoption grows. Without such intermediaries being able to effectively and efficiently manage cloud services, cloud service consumers must manage numerous transactions (e.g., payments, governance, data movement, customization and enrichment) associated with their cloud service providers and cloud services. This can rapidly become a task that is difficult, time-consuming and expensive, especially when they are consuming numerous cloud services from independent providers. Furthermore, traditional approaches for managing cloud services leads to the adverse situation of vendor "lock-in" in which cloud service consumers are undesirably tied to a particular vendor or set of vendors for all or a portion of their cloud services. Therefore, a platform that enables cloud service consumers to manage these numerous transactions associated with their cloud service providers and cloud services in an effective and efficient manner would be beneficial, desirable and useful.

SUMMARY OF THE DISCLOSURE

Embodiments of the present invention relate to methodologies and systems for enhancing cloud services through use of a cloud services brokerage (CSB) platform. The CSB platform enables a centralized resource within a cloud service consumer (e.g., personnel within an IT department of a business) to implement and manage all aspects of transactions associated with their cloud service providers and cloud services (e.g., payments, governance, data movement, customization, enrichment, etc) in an effective and efficient manner. In doing so, the CSB platform provides the centralized resource within the cloud service consumer to assume exclusive command and control for managing its cloud services. In the context of a CSB platform, a CSB is a third party company, or Enterprise IT Cloud Administration Organization, that adds value to cloud services on behalf of cloud service consumers. The goal of a CSB is to make the service more specific to a company, or to integrate or aggregate services, to enhance their security, to establish and manage contract based pricing, or to do anything that adds a significant layer of value (i.e. capabilities) to the original cloud services being offered.

A CSB platform configured in accordance with an embodiment of the present invention offer numerous benefits over traditional cloud management models such as the traditional cloud management model 100 discussed above in reference to FIG. 1. One benefit that the CSB platform provides is a unique, new approach to providing operations modeling and planning intelligence for enabling cloud service consumers to efficiently and effectively operate in current and future cloud computing environments such as to manage business demand and IT supply processes and relationships. For example, the CSB platform serves as a governance center driven by business, supported by enterprise IT and cloud providers. Another benefit that the CSB platform provides is that it serves as aggregation point for cloud resources, cost and SLA management to design, deploy, manage and govern cloud service solutions. Still another benefit that the CSB platform provides is that it provides a common financial model for IaaS, PaaS, and/or SaaS functionalities across various cloud configurations such as, for examples, public clouds, private clouds, and/or hybrid clouds. In a private cloud, the cloud infrastructure is self-owned such as being operated solely by an organization. However, it can be managed by the organization itself or a third-party provider and can exist on or off the organization's premise. In a public cloud, the cloud infrastructure is made available to the general public or a large industry group and is vendor-owned. A hybrid cloud is a combination of both private and public clouds, are organized so that a portion of the infrastructure is deployed in a private cloud and the rest is exposed on the public cloud.

Still another benefit that the CSB platform provides is providing choice and cost comparisons for determining whether to take a service to the public cloud or keep it internal based on risk/value profile. Still another benefit is that the CSB platform enables a rapidly changing IT service supply chain of cloud services through on-boarding of new cloud services and off-boarding retired cloud services in such a way as to minimize the disruption to end customers, while enabling them to leverage the benefits of new and better value cloud services.

In view of the disclosure presented herein, a skilled person will appreciate that a CSB platform configured in accordance with an embodiment of the present invention is a portal arrangement that enables easy-to-use broker capabilities for cloud services, supporting multiple customers and integrating several different providers, allowing a cloud services consumer (i.e., including its cloud services users) to design, order, provision and control cloud services from a single portal. A cloud services consumer can use a CSB platform configured in accordance with an embodiment of the present invention to provision virtual data centers (VDCs), then find and order services through a single unified web 2.0 interface; to directly access and manage provisioned resources and deploy applications; to track changes through a workflow for technical, legal and financial approvals; govern finances and capacity planning, both for current resources and future growth; and to view multiple command and control tracking dashboards and download them as PDF or Excel files.

With regard to designing cloud solutions, a CSB platform configured in accordance with an embodiment of the present invention allows a cloud service consumer to compare and highlight key differences and features of multiple provider offerings, such as security, service level agreements and cost, to determine the best-fit for their needs; to design the deployment architecture of cloud resources to run their application(s) using a "single pane of glass" view; to use a resource solution center of the CSB platform as a one-stop shop for all of its virtual resource services needs; and to add infrastructure services such as shared storage and backup services; network services such as VPN, and managed services such as back-up administration and security management.

A CSB platform configured in accordance with an embodiment of the present invention provides a cloud service consumer with a simple, comprehensive means for ordering cloud services. To this end, such a CSB platform allows a cloud service consumer to view a comprehensive bill of materials for every application and virtual data center design, generated automatically across multiple providers chosen from an extensive catalog of services; to review the terms and conditions for every designed solution in a single simplified view; and to submit and place consolidated orders for your solution directly from a single interface. Monitor the technical, financial, and legal approvals using a workflow.

With regard to provisioning cloud solutions, a CSB platform configured in accordance with an embodiment of the present invention allows a cloud service consumer to provision multiple VDC change orders at once, with all provisioning tasks identified as a single set and automatically provisioned together; to automatically manage virtual resources and service provisioning using an intelligent asynchronous provisioning engine; and, once provisioned, to view the access and management details at any time.

With regard to controlling cloud solutions, a CSB platform configured in accordance with an embodiment of the present invention allows a cloud service consumer to manage bills across multiple cloud service providers with one automatically consolidated monthly bill; to monitor and control cost and capacity trends, aggregate and correlate every bill item cost to resources and capacity, and view dashboards of aggregate spend across applications and VDCs; and to view monitoring dashboards to compare utilization of resources versus cost, and see if you are over or under capacity or cost for any of your applications across environments and layers.

A CSB platform configured in accordance with an embodiment of the present invention provides a cloud service consumer with an intuitive user interface. To this end, such a CSB platform provides a cloud service consumer with a central web/Internet based portal enabled to implementing broker capabilities for cloud services (e.g., cloud infrastructure services). As a skilled person will appreciate from the disclosures presented herein, a CSB platform portal configured in accordance with embodiments of the present invention offers wizard-based tools for screening applications for cloud deployment, identifying target cloud infrastructures, estimating capacity required on the cloud, comparing provider prices side-by-side, creating a migration roadmap, and finally evaluating the ROI of cloud migration; single view for designing application architectures in the cloud, assigning portions of the architecture to different cloud providers, automatically provisioning the entire architecture simultaneously, and cost estimation; dashboards for consolidated billing, utilization monitoring, and security monitoring; and command and control screens for provisioning authorization, workflow orchestration, and provider compliance evaluation.

The CSB platform can support many cloud service consumers and connects many cloud service providers with a catalog and services-integration framework. Cloud service consumers can use the CSB platform to find, order, and manage services through a single unified Web 2.0 interface and enables ordering and provisioning of virtual resources. The CSB platform enables resource change management, and ongoing financial governance of charges from providers across many applications and virtual data centers.

In one embodiment of the present invention, a process implemented by a cloud service brokerage platform comprises a plurality of operations. An operation is performed for determining a target cloud computing environment for an application using target deployment determination information received from a user of the cloud service brokerage platform. An operation is performed for determining a cloud benefit score characterizing a degree of benefit from deploying the application in the target cloud computing environment. Determining the cloud benefit score includes using cloud benefit basis information received from the user to predict responses to cloud benefit queries and enabling the user to replace at least a portion of said predicted cloud benefit query responses with user-specified cloud benefit query responses. An operation is performed for determining a cloud readiness score characterizing a degree of readiness for deploying the application in the target cloud computing environment. Determining the cloud readiness score includes using cloud readiness basis information received from the user to predict responses to cloud readiness queries and enabling the user to replace at least a portion of said predicted cloud readiness query responses with user-specified cloud readiness query responses. An operation is performed for conveying the target cloud computing environment, the cloud benefit score and the cloud readiness score to the user.

In another embodiment of the present invention, a process implemented by a cloud service brokerage platform comprises a plurality of operations. An operation is performed for assessing target deployment determination information of an application to determine a target deployment environment for the application. In response to the assessing of the target deployment determination information resulting in a determination that the target deployment environment is a cloud computing target deployment environment, an operation is performed for receiving cloud deployment basis information for the application. Thereafter, an operation is performed for determining information characterizing a degree of benefit from deploying the application in the target deployment environment and a degree of readiness for deploying the application in the cloud computing environment. Determining said benefit and readiness characterizing information includes using the cloud deployment basis information to predict responses to queries defining benefit from deploying the application in the cloud computing target deployment environment and to predict responses to queries defining readiness for deploying the application in the cloud computing target deployment environment.

In another embodiment of the present invention, a process implemented by a cloud service brokerage platform comprises a plurality of operations. For each one of a plurality of applications for a cloud service consumer, an operation is performed for determining application deployment assessment metrics followed by an operation for characterizing deployment prioritization for each one of the applications with respect to each other one of the applications. The characterizing is performed using the application deployment assessment metrics of each one of the applications. Thereafter, for a particular one of the applications, an operation is performed for selecting cloud resource provider options from a collection of available cloud resource providers dependent upon a target cloud computing environment defined in the application deployment assessment metrics of the particular one of the applications.

These and other objects, embodiments, advantages and/or distinctions of the present invention will become readily apparent upon further review of the following specification, associated drawings and appended claims.

BRIEF DESCRIPTION OF THE DRAWINGS

FIG. 8B is an illustrative view of showing configuration of a custom package that is included as an available package offering in the cloud services sourcing screen of FIG. 8A.

Figure 12:
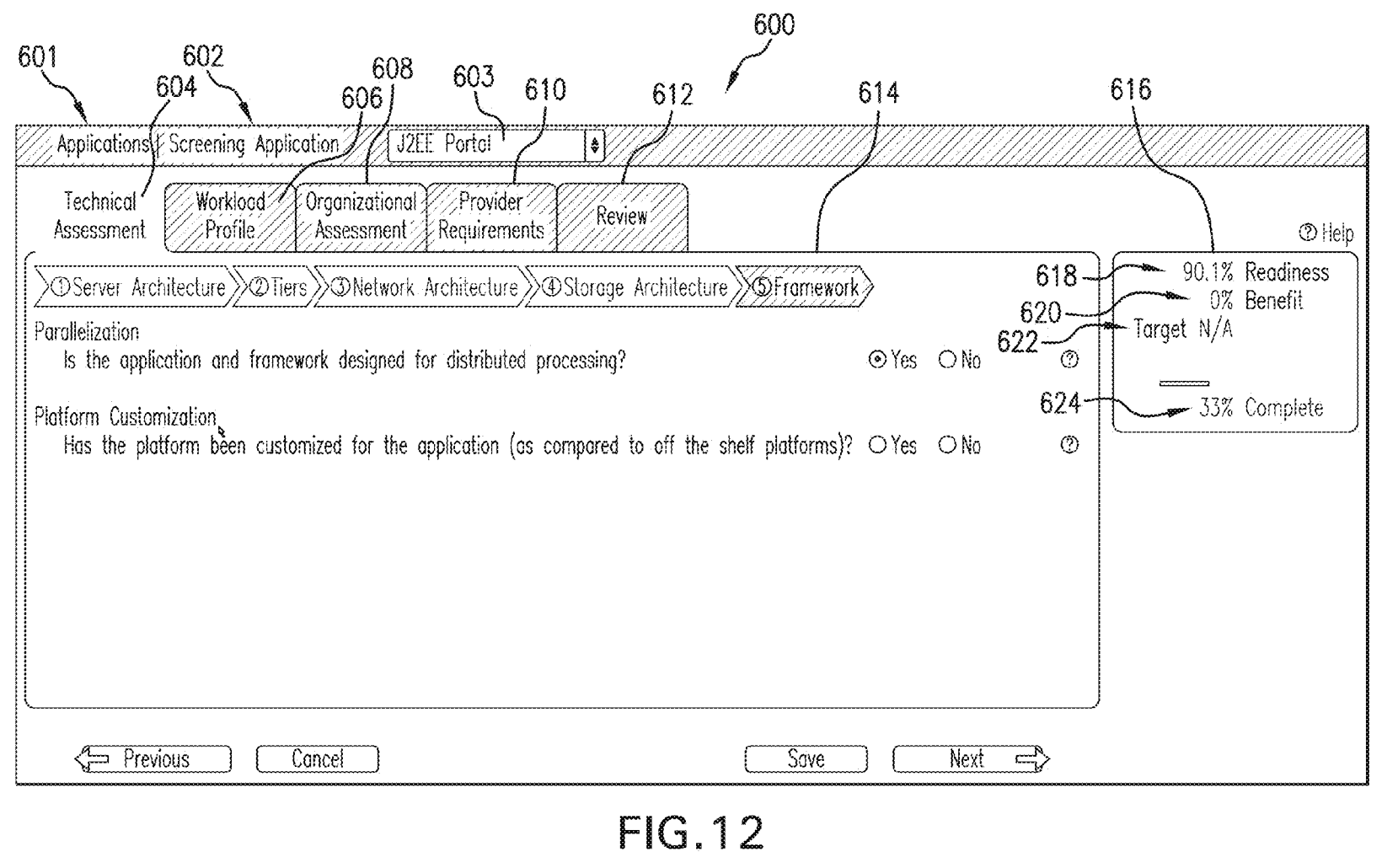
Figure 14:
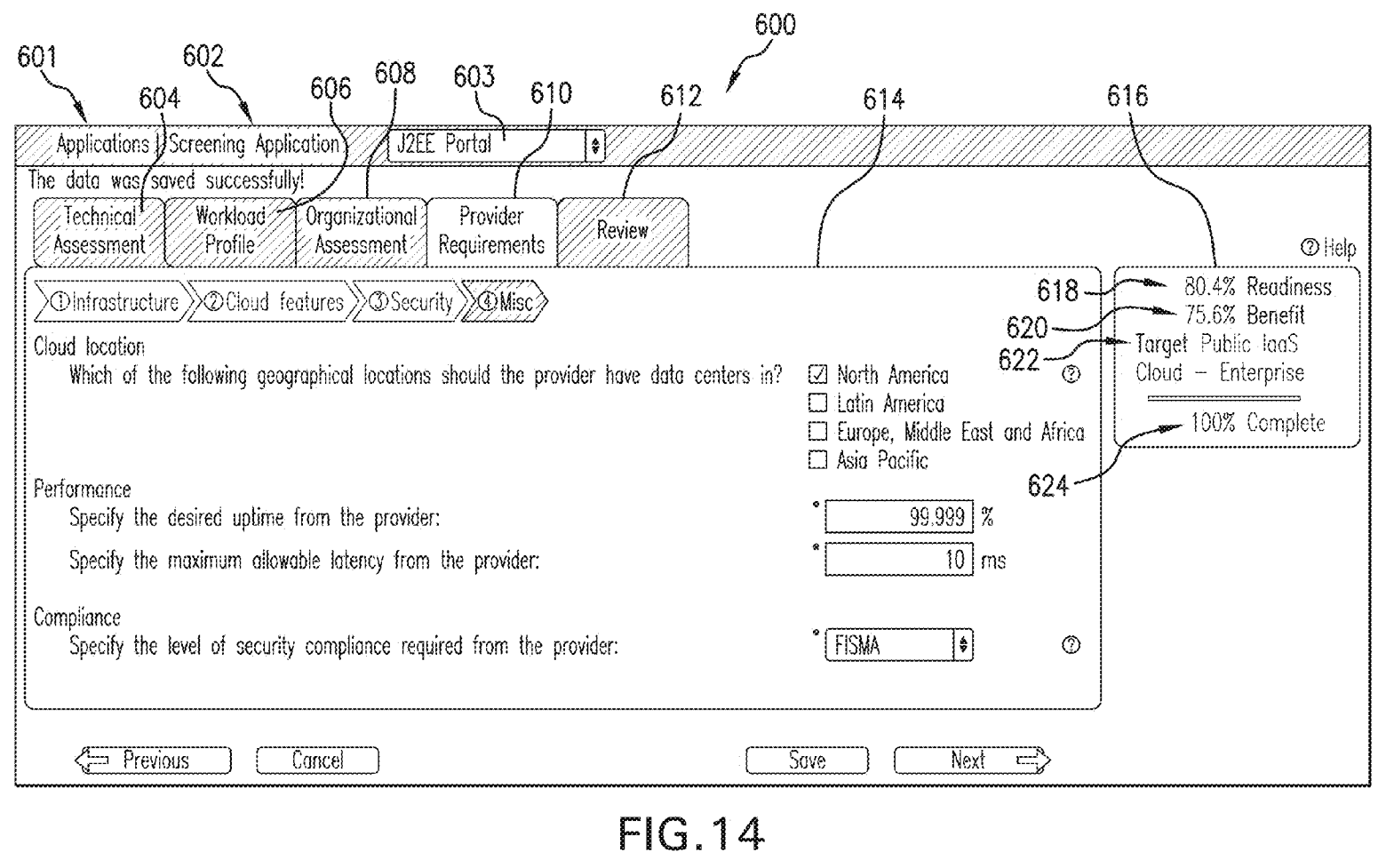

FIGS. 11-16 are illustrative views showing various aspects of an application screener configured in accordance with a second embodiment of the present invention.

DETAILED DESCRIPTION

CSB Platform Architecture

Figure 1:
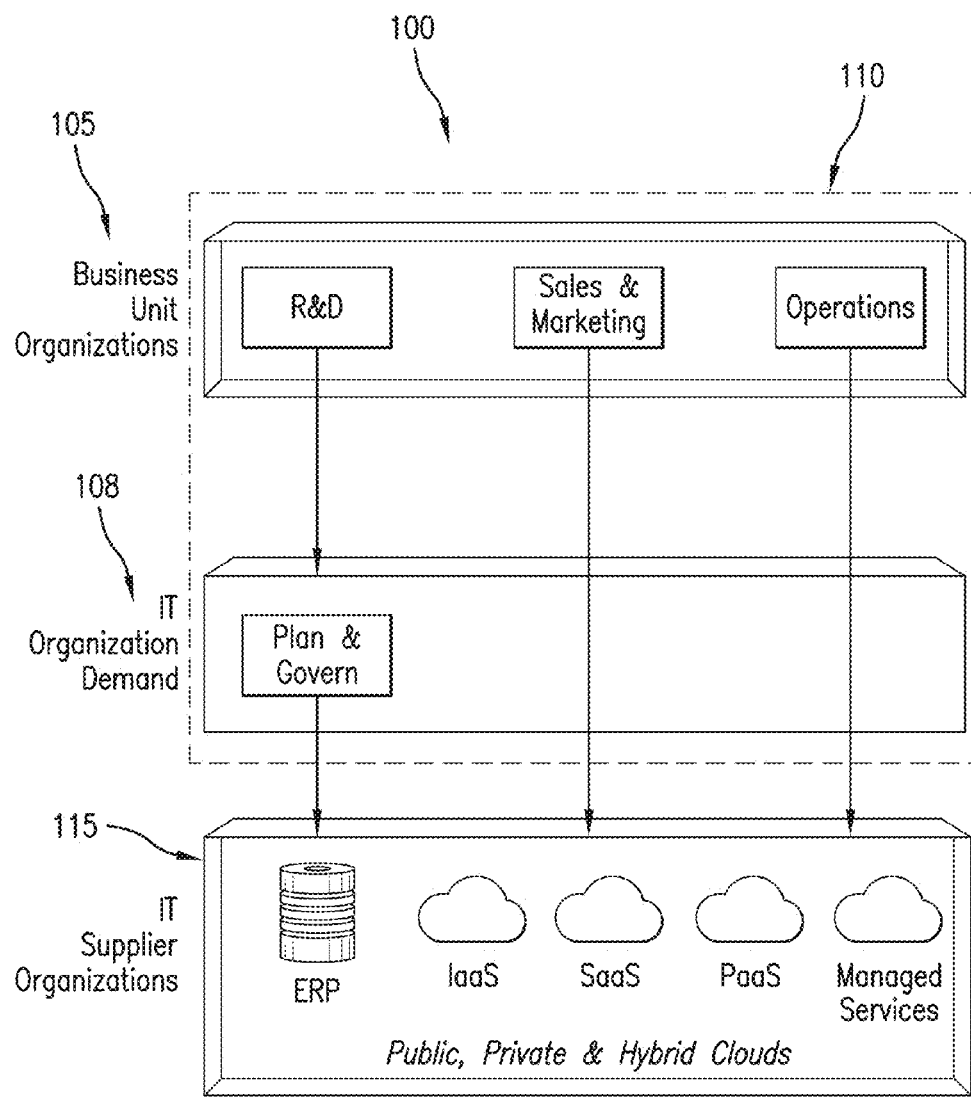
FIG. 1 is an illustrative view showing an example of a traditional cloud management model leading to cloud service users of a cloud service consumer directly implementing cloud services via cloud service providers.
Figure 2A:
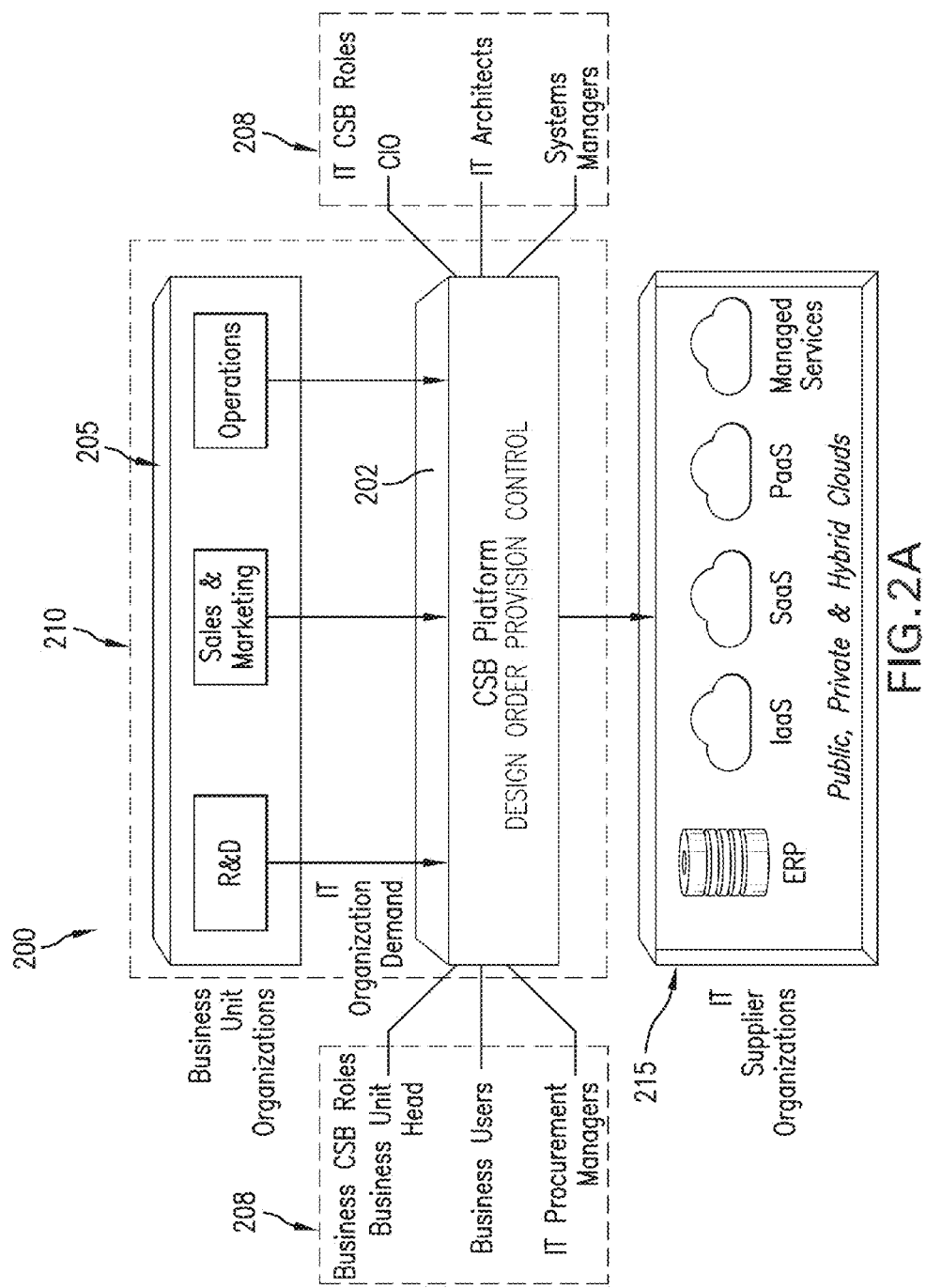
FIG. 2A is an illustrative view showing an example of a cloud management model configured in accordance with an embodiment of the present invention.
Figure 2B:
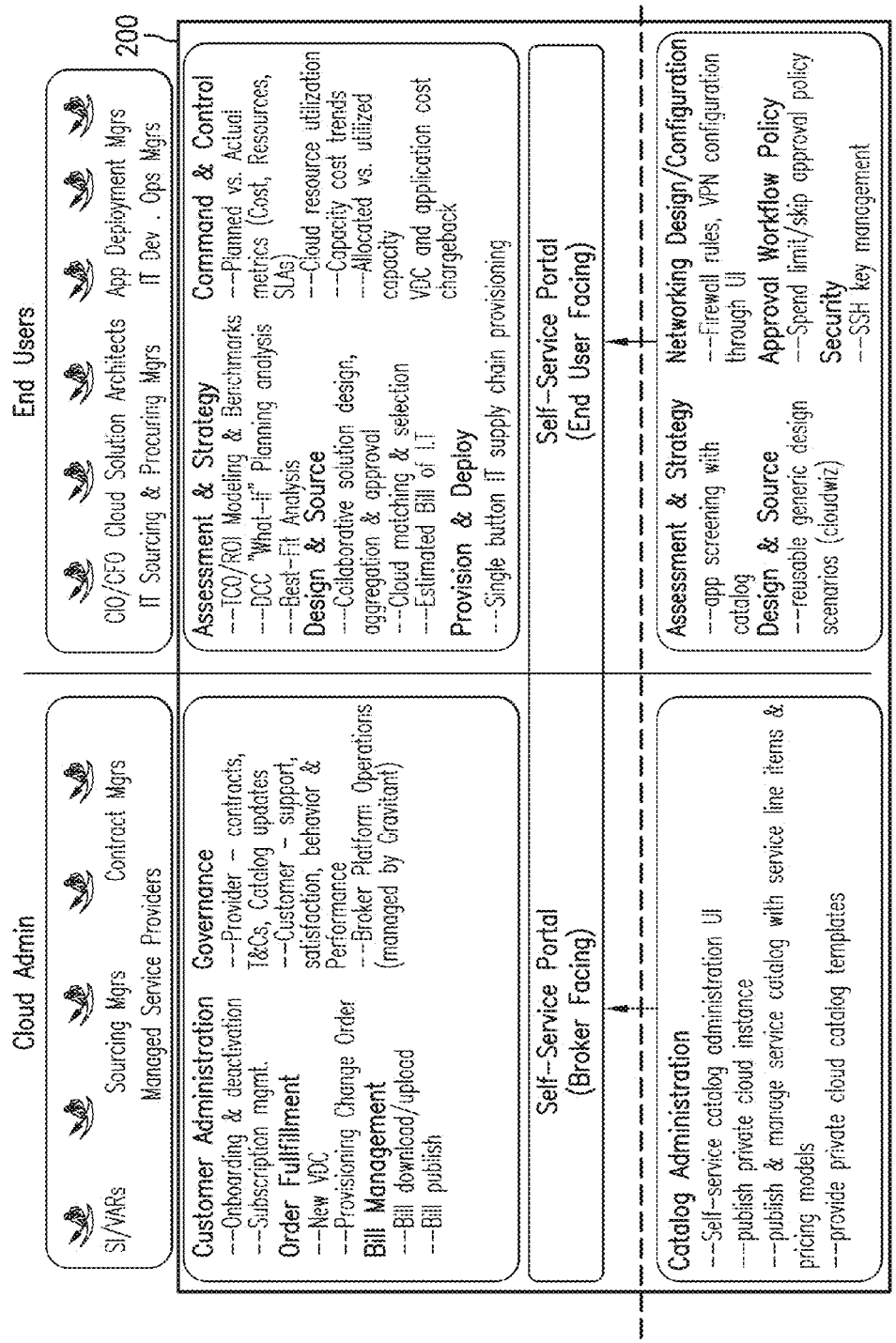
FIG. 2B is diagrammatic view showing a detailed implementation of the cloud management model of FIG. 2 as viewed from Cloud Administrator and End User perspectives.

Referring to FIGS. 2A and 2B, various aspects of a cloud management model 200 configured in accordance with an embodiment of the present invention are shown. Advantageously, the cloud management model 200 implements a CSB platform 202 through which business unit cloud service users 205 and CSB role cloud service users 208 (i.e., cloud service users) of a cloud service consumer 210 access cloud services via cloud service providers 215 (e.g., providing services via one or more outside networks with respect to the CSB platform 202). The CSB platform 202 enables cloud service users of the cloud service consumer 210 to enhance the manner in which it implements cloud consumption across public, private and hybrid clouds. For example, the CSB platform 202 enables cloud service users of the cloud service consumer 210 serving in an IT capacity (e.g., IT architects, system managers, information executives and the like) to limit the complexities and risks of implementing cloud services across multiple providers, allowing for increased agility, standardization of a cloud consumption model, formalization of accounting processes and implementation of compliance and governance.

The CSB platform 202 can be implemented in a variety of manners. In a first implementation, the CSB platform 202 is implemented in a manner where it enables an entity to be a trusted cloud service provider for its own customer base (i.e., its own cloud service consumers), to set up and manage secure virtual data centers with multiple cloud providers, and to add third party services such as security, monitoring and backup to build a more complete solution. In this first implementation, the CSB platform 202 serves as a single interface through which this users in customers with a single interface through which the cloud service consumers can design, order, provision, and manage not just cloud services but also traditional IT services have been provided to them in the past. In a second implementation, the CSB platform 202 is implemented in a manner where it enables an IT organization to maintain complete cost and SLA visibility and governance, while providing its users with a single interface through which they can design, order, provision, and control infrastructure and platform services from a myriad of public, private, hybrid and colocation providers.

The CSB platform 202 has a plurality of associated entities that directly or indirectly interact with it. Though the roles and responsibilities can vary for in certain implementations based on the needs of the specific brokerage, following is a summary of such entities. Broker refers to an entity that owns a cloud service brokerage. The Broker is responsible for contractual oversight of the brokerage, governance, and communication to agencies & consumers to facilitate and increase adoption. The Broker may take on additional roles that can be delegated to the Broker Operator. These additional roles are billing intermediary between broker operator and consumer agency and payment handling. Broker Operator refers to an entity that runs the business operations of the brokerage (e.g., billing management & invoicing, Provider agreements, SLAs and relationship management, pricing management, customer on-boarding including customer agreements, etc.) and technical services (e.g., federated help desk, new provider on-boarding, cloud architecture and design services, additional integrations and customizations, migration services, application management services, other managed services). Some of these roles may be a separate entity such as a System Integrator. For example, if the Broker chooses to manage the business operations and act as the Broker Operator, the Broker may choose to have a System Integrator or vendor perform the technical services. Brokerage Platform Operator refers to the entity that maintains and provides access to the CSB platform. Its responsibilities can include deployment, ongoing upgrades and release management, technical operations, level 3 support for the brokerage portal, etc. Cloud Service Provider refers to the entity that provides the requested cloud services, technical support for published APIs, monthly metering and billing, meet SLAs and provider terms, Level 3 support for provisioned resources, participate in critical problem triage and resolution processes, solution design review and approve (optional), etc. Cloud service consumer refers to an entity that is a register user on a portal of the platform. The Cloud Service Consumer manages users and access control through role assignments, sets spending limits and purchase orders, undertakes cloud architecture and solution design, accesses and uses provisioned resources, receives monthly bills, reviews bills and details through portal, pays bills, monitors performance using the performance dashboards/analytics for cost, capacity and utilization, etc.

Figure 3A:
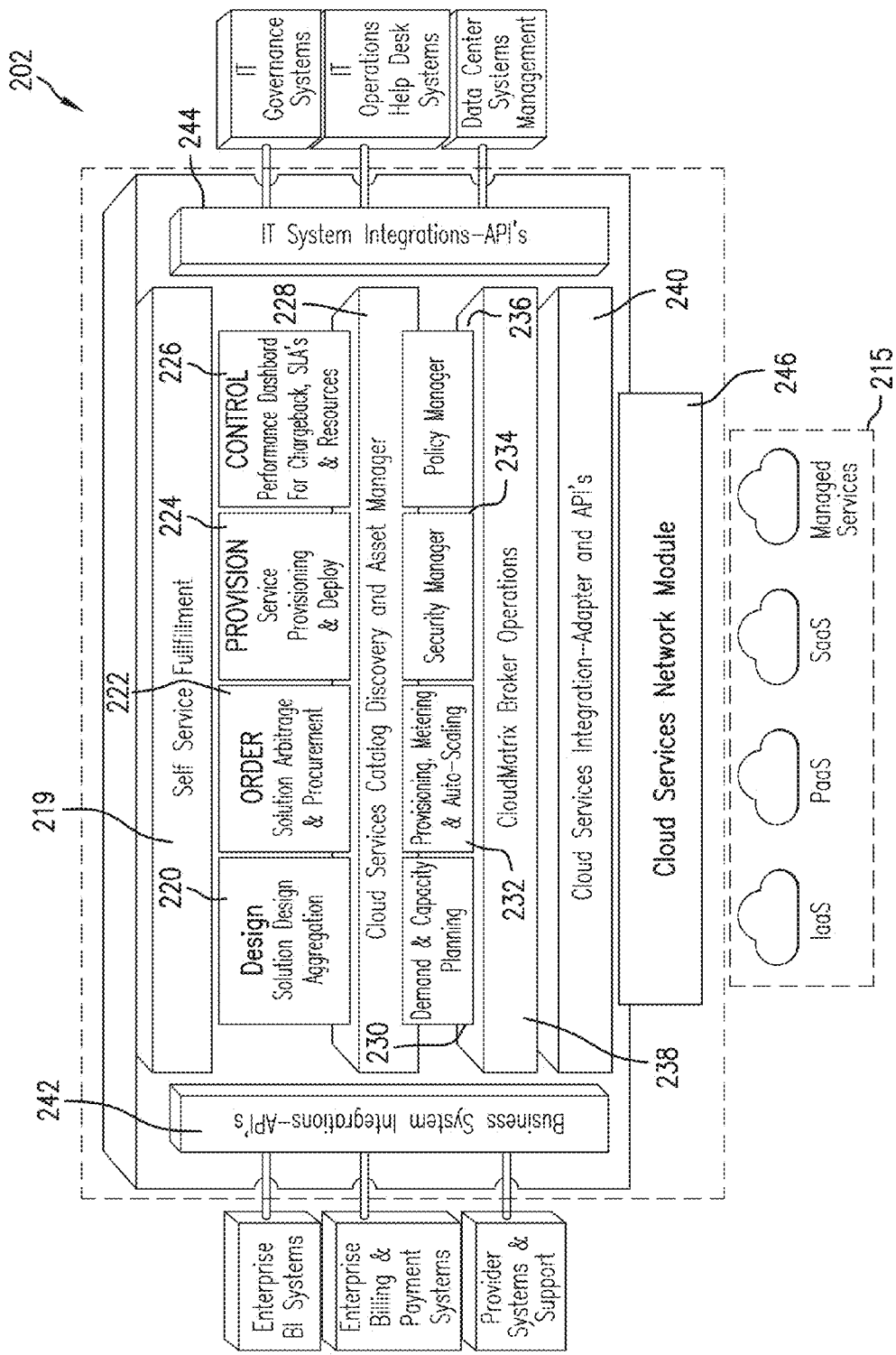
FIG. 3A is a functionality module view of a CSB platform configured in accordance with an embodiment of the present invention.

FIG. 3A shows a functionality module view of the CSB platform 202 (i.e., a CSB platform configured in accordance with an embodiment of the present invention). The CSB platform 202 serves as a cloud services brokerage and management platform that integrates multiple cloud provider services (e.g., internal or external) into a CSB platform portal through which cloud service consumers (e.g., business enterprises) can manage (e.g., optimize) the design, provisioning, ordering and control (i.e., consumption) of cloud services. One example of such a CSB platform portal is provided by Gravitant Inc. at the URL mygravitant.com. Cloud service consumers can deploy core services and features enabled by the CSB platform 202, which are described below in greater detail, through a single user interface of a cloud user accessible portal. These core services and features can be deployed independently or as an integrated suite of cloud services based on specific cloud service needs of a particular cloud service consumer. Advantageously, the CSB platform 202 is technology agnostic and will work and leverage current cloud platforms and business systems deployed of a cloud service consumer.

Advantageously, the CSB platform 202 offers numerous capabilities for allowing a cloud service consumer 210 to enable its cloud service users to implement (e.g., design, order, provision and control) cloud services across public, private and hybrid clouds. Examples of these capabilities include, but are not limited to enabling internal business and IT units to offer their cloud service users a single interface to design, order, provision and control virtual data centers (VDC) in public, private and hybrid infrastructure services; setting up a central environment for carrying out sourcing, procurement, fulfillment and billing processes and contracts with preferred public and private cloud providers; and tracking usage, chargeback, Quality of Service (QoS), SLA's and performance of internal and external cloud infrastructure service providers. Furthermore, the CSB platform 202 enables integration with current IT infrastructure and automation of investments made by a cloud service consumer. Still further, the CSB platform 202 includes a multi-cloud services catalog with services from available public cloud providers (e.g., Amazon, GoGrid, Terremark and Savvis). Accordingly, a cloud service consumer can use a private cloud catalog and service package template to quickly operationalize an enterprise CSB solution. Examples of template content, which are discussed below in greater detail, include service options relating to design and aggregation (i.e., cloud service designing); cloud service sourcing, arbitrage and procurement (i.e., cloud service ordering); service/user provisioning and deployment (i.e., cloud service provisioning); performance dashboards for chargeback, SLA's and resources (i.e., cloud service control); cloud services catalog and asset manager; cloud demand and capacity planning; provisioning, metering and auto-scaling; security management; policy management; broker operations management; cloud services integrations (e.g., adapters & APIs); business systems integrations (e.g., APIs); IT systems integrations (e.g., APIs); and cloud services networking.

In regard to the multi-cloud services catalog (i.e., the catalog), it is highly customizable. Self-service administrative capabilities (e.g., via the self-service fulfillment module 219) are available for the broker to perform actions such as, for example, setting up new cloud services, modifying existing cloud services, customizing the cloud service parameters, updating pricing, reclassifying services, and adding or removing providers. Broadly speaking, the catalog supports an abstraction of marketplace services and categorizations that then maps to provider specific catalog line items. In this regard, a cloud services catalog provides a service abstraction that can map to one or more provider services/line items. For example, a VM service on Savvis maps to vCPU, memory and local storage services with OS templates. For Terremark, Savvis, Amazon, Amazon GovCloud, the aggregated VM services are pre-defined and published in the catalog. Additionally, attributes that are specific to cloud service consumers such as, for example, pricing rules, security and access constraints can be defined in the same catalog. This allows for a high degree of function and flexibility. For example, a consumer level service may be a packaged VM, which may translate into multiple provider catalog line items thereby significantly reducing complexity of the cloud for the consumer. This also simplifies maintenance as well as enables comparison of cloud services and plans from different providers. Accordingly, it will be appreciated that the CSB platform 202 can be configured with an integrated catalog and solution configurator that provides a unique capability to access services from providers that are required to enable a cloud service consumer solution. This integrated catalog and solution configurator provides transparency of provider capabilities and enables the customer to make the right choices from a technology, operational and management perspective.

The catalog has predefined metadata for service providers and services such as capacity limits, and allowed capacity configurations for CPU, memory, local storage, NAS storage etc. for different providers. These constraints are then applied at the time of solution design and Architecture. The total capacity being procured is also displayed to the user while the solution is being iteratively designed. If the predefined capacity limits are exceeded, warning and error messages can be displayed to the user as appropriate. With the ability for the cloud provider to have predefined capacity configurations such as specific vCPU sizes, specific RAM sizes, and storage blocks, it makes the catalog more end-users friendly and self-service. Through use of a catalog administration capability, an operator of the CSB platform 202 can update the metadata of the catalog to change the limits and predefined capacity configurations. For the cloud service providers already integrated into the CSB platform, these capacity configurations have already been defined as part of the content that is available as pre-configured selections.

Figure 3B:
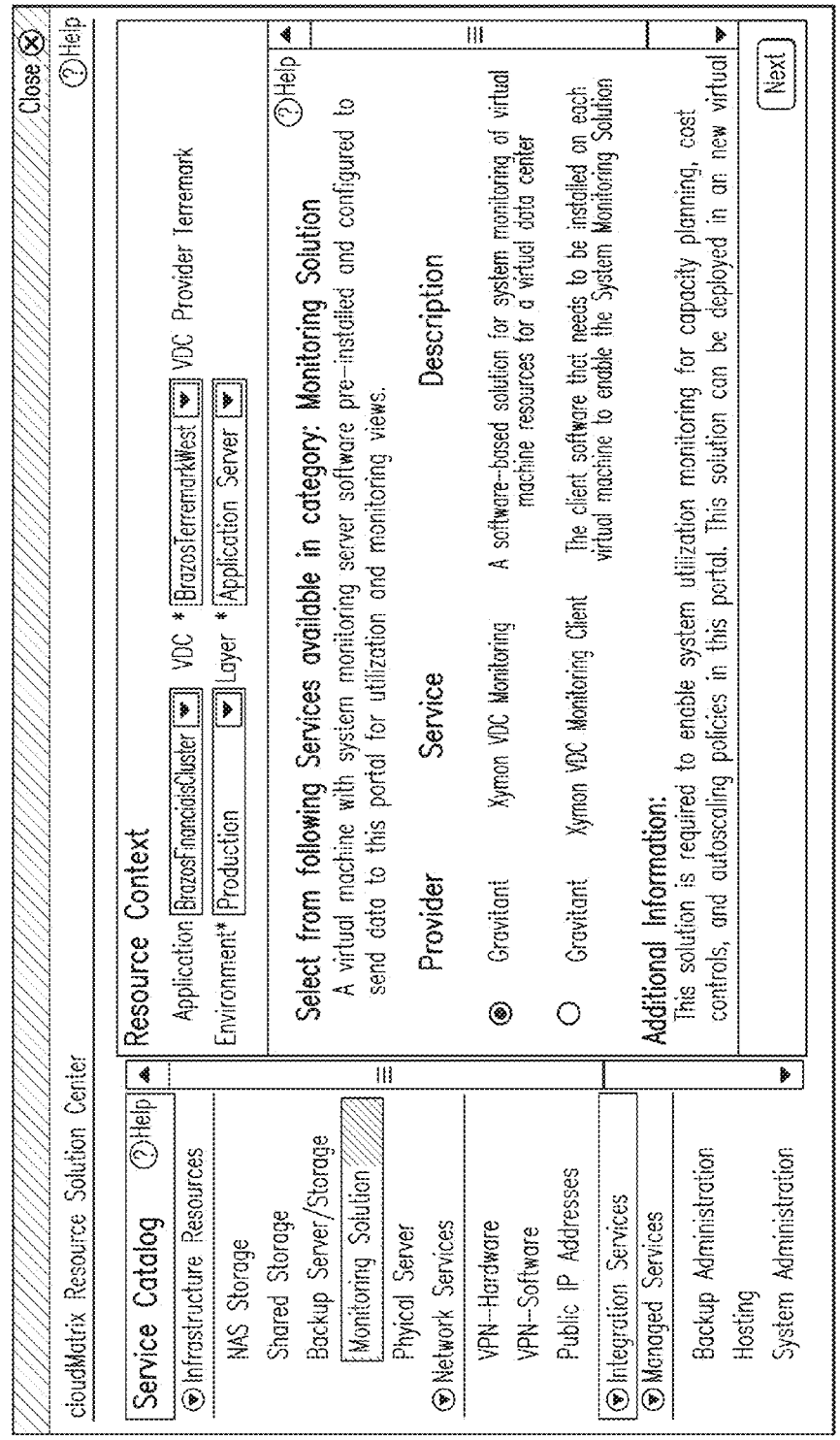
FIG. 3B is an illustrative view showing a resource solution center configured in accordance with an embodiment of the present invention.

FIG. 3B shows a resource solution center 221. The resource solution center 221 serves as a single point (e.g., one-stop) source for all of virtual resource service needs of a user of the CSB platform 202, in FIG. 3A. The resource solution center 221 correlates service catalog line items to an available cloud service selection (i.e., a resource context). Through the resource solution center 221, a user can identify and add infrastructure services such as, for example, shared storage and backup services; network services such as VPN; and managed services such as back-up administration and security management. Examples of infrastructure services include, but are not limited to shared storage (e.g., a cloud-based storage service for backup server software and shared backup storage) and a monitoring solution (e.g., a VM with system monitoring server software pre-installed and configured to send data to this portal for utilization and monitoring views). Examples of network services include, but are not limited to, VPN hardware (e.g., a hardware-based Virtual Private Network (VPN) solution that enables a Site to Site VPN managed by the VDC provider) and VPN software (e.g., software-based VPN solutions that allow for a lower cost secure VPN gateway and can enable Client to Site and Client to Site VPN). Examples of managed services include, but are not limited to, backup administration (e.g., services offered by IT operations service providers to configure backups, maintain backup schedules, monitor and verify backups, and restore backups as needed); system administration (e.g., services offered by IT operations service providers to setup, configure, and support cloud environments, including systems, virtual machines, storage, and networks); and security management (e.g., services offered by IT operations service providers to setup operational security policies, manage virtual private networks, and manage ongoing security, including audits and compliance).

Referring to FIG. 3A, a design module 220 of the CSB platform 202 enables (e.g., via a CSB platform access portal interface (i.e., part of the self-service fulfillment module 219) of the CSB platform 202) comprehensive cloud planning services (i.e., solution design and aggregation functionality). Cloud adoption scenarios can be simulated using prediction analytics for business applications and infrastructure resource needs. Demand, capacity, cost (TCO) and ROI baselines can be forecasted and established for each cloud solution and the internal and/or external cloud service platforms being used. Scenario dashboards can be saved and published and used to provide access to business organizations, IT resources, vendors and the like to align all parties on goals and implementation activities. Examples of information generated and tasks implemented using the design module 220 include, but are not limited to, visual architecture management; solution design and aggregation; application definition and management; and solution scenario design. Accordingly, a skilled person will appreciate that benefits of the design module 220 include, but are not limited to, accurately simulating and predicting cloud capacity and cost for a given application demand profile; clearly understanding cloud capacity needs and cost for each cloud provider before making investment decisions; running cloud consumption scenarios to understand cost, capacity and demand trade-offs/risks; accurately setting IT budgets for cloud computing projects; comparing cloud capacity, costs and SLAs across cloud provider offerings and platforms; clearly establishing and track ROI and TCO metrics for each cloud solution and project; and controlling and managing IT assets in the cloud and reduce cloud/virtual machines (VM) and subscription sprawl.

A virtual machine (VM) refers to a virtual computer that uses the resources of one or more real computers, but which is functionally indistinguishable from a physical computer running the same software from an end user's perspective. For example, in case in which there is a need to set up a new mail server, instead of buying a server (which may only actively process email 1% of the time), installing and configuring the mail server, configuring and maintaining networking for the server, and paying for the electricity and maintenance for the server, a cloud service consumer can pay a cloud service provider to set up a virtualized mail server. This server would run all the same software as the physical server, but would live in a VM that sits atop one or more physical servers which have (at a minimum) the same capabilities (CPU, memory, storage) as the local physical server necessary to run the same software. In turn, this same hardware used by the cloud service provider may support multiple other VMs, none of which use all the hardware system's resources. The cloud service users of the cloud service consumer would send and receive mail from this VM server exactly the same way they would if the server was physically located on premises of the cloud service consumer. In contrast, a virtual data centers (VDC) is similar to physical data centers. A VDC allows dynamic creation of virtual resources atop a physical infrastructure, including CPU, memory, storage, and network capacity. A VDC can be thought of as a container for a VM or as a server rack. Just as a server rack itself does not run any applications, a VDC does not itself run any applications; each is provisioned with servers (e.g., VMs) that run applications. VDC resources can be created on-demand and managed as a pool of virtual resources and controlled through an online user interface. Instead of ordering specific line items from a catalog, VDC is designed with capacity and/or virtual resources and then the system automatically generates an order for the provider to fulfill that VDC design. A VDC can be deployed on internal physical/virtual environments or in public clouds. A VDC can comprise of VMs, storage, one or more networks (subnets), VPNs, Firewalls, load balancers, and any other infrastructure as a service.

Still referring to FIG. 3A, the above-mentioned solution design and aggregation functionality implemented via the design module 220 often entails conducting an "apples-to-apples" comparison of cloud services from a variety of cloud service providers. However, quite often, each cloud service provider has a different style of presenting cloud services and resources to the end-consumer. At a high level, even their business models vary in the sense that certain providers employ reserved capacity vs. on-demand capacity methods of enabling a consumer to procure cloud resources. The CSB platform 202 is configured with a plurality of methods to perform such comparisons.

One method for performing such comparisons is through use of a cloud services planning wizard. An underlying component of the cloud services planning wizard is a metric parameter referred to as a Capacity Unit (CU), which is central to enabling precise cloud service comparative capabilities for measuring, comparing, metering and enforcing quality, performance and cost standards across cloud vendors for different cloud services. The CU is a generic unit of IT capacity that is a function of multiple factors such as, for example, processor speed, random access memory, storage, and bandwidth. In one specific implementation, 1 CU=the capacity to compute at a speed of 2.4 GHz with random access memory of 4 GB and local storage of 100 GB through 1 Mbps of bandwidth. It should be noted that the CU value scales differently with respect to each factor and its value intends to represent the effective realization of the individual capacity components.

By employing the cloud services wizard (which can include an application screener) to assess information derived from a knowledge base of information based on experience and best practices and to calculate CUs for various cloud service providers, the CSB platform user is guided towards an apples-to-apples comparison that results in the closest matched cloud services and cloud service providers. In at least one implementation, the cloud services wizard takes into account dimensions such as, for example, virtual machine dimensions (e.g., memory, CPU/vCPU, local storage, etc); network dimensions (bandwidth desired, virtual LAN, guaranteed throughput, pricing models, load balancers, public vs. private networks, etc); storage dimensions (e.g., defining different architectures, ability to snapshot storage, back up strategies for storage as well as offering shared storage, etc); security dimensions (e.g., firewalling technologies, intrusion detection/prevention technologies, etc); service level agreements (e.g., availability monitoring and service crediting); operating systems supported (e.g., employing templates with licenses, 32/64 bit operating systems, support for blank servers, virtual machines registered and compliant with certain operating systems, etc); provisioning times (e.g., for virtual machines, for provisioning the first virtual data center vs. subsequent virtual data centers, etc); support for virtual resources (e.g., varying from free, forum based support to full helpdesk support that is included for no additional fees); designation of location of virtual resources (e.g., geographic designation and specific locales based on CSP data center availability); and virtual resource pricing structure (e.g., varying by sizing of packages vs. individual resources that may vary by pricing model for reserved capacity vs. on-demand capacity).

Another method for performing such comparisons is through use of a service offerings comparator. By using a normalized scheme of small, medium and large cloud service packages (or other custom packages) of well-defined capacity including compute, storage and memory with normalized utilizations and allocation models, the CSB platform provides a quick pricing comparison for these multiple packages across cloud services and providers.

Still referring to FIG. 3A, the CSB platform 202 supports two models for creating and accessing accounts on the cloud service providers that it manages—Broker managed provider accounts and Customer managed provider accounts. The brokerage can be configured to support both models or either the Customer managed model or Broker managed model. In the broker managed provider accounts model, for example, a broker operations team creates accounts for each cloud provider and inputs the credentials to the portal based on customer (e.g., user) requests. Alternately, a broker can also have reseller relationships with the providers to have predefined accounts which can be set up in the system, and when a customer orders services, the broker simply assigns one of the predefined accounts to this customer. In the customer managed provider accounts model, for example, the customer may already have provider accounts or would prefer to directly create and manage the provider accounts. The customer sets up the account in CSB platform portal and provides the provisioning credentials, and billing credentials, if any. The brokerage portal can then perform all the functions such as catalog, solution design, order approval workflows, screening, provisioning, billing load by customer, cost allocation, dashboards, etc.

An order module 222 of the CSB platform 202 enables (e.g., via the CSB platform access portal) broker services enabling business and IT users the ability to engage with cloud service providers for building business and technology relationships (i.e., sourcing, arbitrage and procurement functionality). It offers a central point for a cloud service consumer to quickly aggregate cloud solutions, procure and pay for them by combining cloud services from different providers to meet business needs, cost constraints and innovation requirements. Examples of information generated and tasks implemented using the order module 222 include, but are not limited to, bill of materials estimates, advanced pricing rules, service offering comparators, provider account management, and procurement process flow. Accordingly, a skilled person will appreciate that benefits of the order module 222 include, but are not limited to, quickly setting up enterprise procurement portal(s) and streamlining cloud acquisition processes across business and IT organizations; meeting new business demand or scalability by having access to multiple cloud providers; ready access to cloud services from internal and external providers with integrated provisioning and procurement processes; being aligned with cloud market changes including product, pricing, packaging, and SLA changes from vendors; reducing cloud costs by comparing cloud service combinations for any given solution; performing real-time spend analysis across providers; optimizing as provisioning and de-provisioning systems are integrated with billing and order management; and reducing time and cost in billing, metering and payment management though a centralized bill and payment capability.

A provision module 224 of the CSB platform 202 enables (e.g., via the CSB platform access portal) cloud management services for users through a single view of cloud services resources from internal or external providers (i.e., service/user provisioning and deployment functionality). A cloud service consumer (e.g., an enterprise IT department) can use the provision module 224 to design application architectures and setup virtual data centers across multiple internal and external providers and manage it from one central location. Furthermore, cloud service consumers can create environments (e.g., Dev, Test, Production and DR) for a business application from different providers and manage them. Examples of information generated and tasks implemented using the provision module 224 include, but are not limited to, automated provisioning and deployment of IaaS and PaaS resource groups/clusters; workflow-based provisioning; auto-scaling service for one or more cloud service providers; and deployment workflow automation. Accordingly, a skilled person will appreciate that benefits of the provision module 222 include, but are not limited to, no vendor or technology lock in, rapid setup of virtual data centers and real time provisioning of IaaS, PaaS, SaaS, Managed Services and other cloud resources across multiple cloud providers, reduced cloud infrastructure costs by continuously optimizing utilization, enhanced resource availability for business applications to meet scalability and performance, enhanced cloud resource allocation to business application and business units, enabling customized cloud data center solutions by adding third party support services, and leveraging current investments in monitoring and management tools sets.

A control module 226 of the CSB platform 202 enables (e.g., via the CSB platform access portal) command and control services that are critical to successful adoption and acceptance of the cloud services model (i.e., dashboard functionality for chargeback, SLAs and resources). A cloud service consumer can gain visibility into current performance, cost and utilization of cloud services and compare against planning benchmarks/milestones to automatically initiate corrective action to continuously optimize cost, resources and SLAs to meet business demand and changes. Furthermore, a cloud service consumer can automatically track, define, establish, and report chargeback against business applications, business units, IT budget codes and/or shared resource categories. The provision module 224 includes a plurality of pre-configured dashboard views for chargeback, SLA's and resources. Examples of the pre-configured dashboard views include, but are not limited to, cloud analysis by virtual data center (VDC), application, customer, and business units/departments; capacity cost trends (e.g., compute, memory, network, managed services analysis of capacity vs. cost and trends over time); cost analysis (e.g., by resource type, environment and layer); capacity summary (e.g., allocated capacity, integrate with utilized capacity); cloud utilization & detailed utilization (e.g., monthly/daily utilization for avg/max of CPU/memory utilization and trends over time; aggregation of utilization data for cloud analysis by VDC, application, environment, layer, and resource groups; drill down to system monitoring tool; adapter based integration with any system monitoring tools; deployment template and provisioning for Xymon monitoring server/clients, and ability to deploy & provision other application and system monitoring technologies; and VDC and application cost chargeback); custom dashboards/reporting and activity logs for audit and tracking; and alerts (e.g., capacity changes, utilization thresholds, cost thresholds, and user access changes). Accordingly, a skilled person will appreciate that benefits of the provision module 222 include, but are not limited to, business and IT Management having visibility and control over the cloud ecosystems, costs, resources and SLAs; eliminating unrestricted/unintended spending with alerts, procurement and provisioning workflows; making more accurate investment decisions that continuously reduce cost and optimizes resource utilization; implementing proactive action on resource, SLA and cost alignment before there is an impact to business; auditing and reporting on all IT financial transactions, owned assets in the cloud by business app, business unit and shared IT resources; real time alignment of business, IT staff, resources, cost and performance; effective cost accounting and cost assignment to specific business units and apps; rapid enablement of IT initiatives for reducing the time between strategic planning and operational execution; continuous baselining of business and IT metrics; and establishing performance benchmarks.

A cloud services catalog and asset manager module 228 of the CSB platform 202 enables (e.g., via the CSB platform access portal) command and control services that are critical to successful adoption and acceptance of the cloud services model (i.e., cloud services catalog and asset manager functionality). Examples of information generated and tasks implemented using the cloud services catalog and asset manager module 228 include, but are not limited to, multi-provider catalog for IaaS, PaaS, SaaS, Managed Services, and Custom Services; extendable and customizable catalog with dynamic attributes and user interface; pricing support for different cloud provider pricing models (e.g., reserved capacity pricing, allocated capacity pricing and pay-as-you-go); manage provisioned assets (e.g., IaaS, PaaS, SaaS, managed and custom services, asset relationships, asset status and life cycle management, etc); automated asset discovery & sync (e.g., discover and make changes to assets in the cloud, sync with assets registered in catalog/asset manager, match process enabling the IT Administrator to resolve any discrepancies, match and compare prices in catalog for discovered assets, etc); and pre-configured content that is pre-populated with several provider offerings for rapid deployment.

A demand and capacity planning module 230 of the CSB platform 202 enables (e.g., via the CSB platform access portal) solution capacity modeling (i.e., cloud demand and capacity planning functionality). Examples of information generated and tasks implemented using the demand and capacity planning module 230 include, but are not limited to, planned vs. allocated vs. utilized capacity; standardized capacity units across cloud providers, cloud models and infrastructure; advanced and dynamic capacity planning (e.g., application capacity model and VDC capacity model; support for shared resources across VDCs, applications, environments and layers; capacity benchmarks using projected utilization profiles; capacity re-baseline using actual utilization data; modeling analysis of forecasted vs. available utilization thresholds for forecasting capacity growth needs, etc); demand planning with business driver-based demand modeling, drivers for normal demand growth or event-based; and integrated demand and capacity planning to update resource capacity and generate schedule or metric-based policies to change resource capacity based on capacity plan.

In regard to demand and capacity planning, the CSB platform (e.g., via the demand and capacity planning module 230) allows a cloud broker (e.g., platform operator) or the end customer (e.g., cloud service customer) to input demand profiles which then get applied to the solution design, and generate a capacity vs. demand curve (e.g., across an IaaS architecture). This enables cloud service consumers to incrementally acquire capacity as the demand grows instead of acquiring a lot of capacity that remains unutilized till the demand catches up. The CSB platform 202 also enables customization of the capacity planning to be tailored to specific customer architectural needs, and complex demand patterns.

A provisioning, metering and auto-scaling module 232 of the CSB platform 202 enables (e.g., via the CSB platform access portal) automated workflow based provisioning, integrated support for secure shell (SSH) based VMs, and deployment automation (i.e., provisioning, metering and auto-scaling functionality). Examples of automated workflow based provisioning include, but are not limited to, asynchronous message-based provisioning across multiple clouds simultaneously; handle and retry provisioning failures workflow to aggregate and manage underlying cloud provisioning task dependencies; hybrid workflow to support combination of automated and manual provisioning tasks; extensible workflow definitions that support custom integrations for Enterprise systems.

A security manager module 234 of the CSB platform 202 enables (e.g., via the CSB platform access portal) various security management functionalities related to cloud services. Examples of such security management functionalities include, but are not limited to, user security management with subscription and role-based access control that allows for multiple models of user security including user group support and password policy, single sign on and advanced security (e.g., support for integration with federated identity and access management systems, enterprise user directory integration, etc); user administration delegation to business units/departments; centralized and delegated user security administration; VPN services and firewall configuration support; VM encryption support across cloud providers; SSH key management for provider accounts, VDCs, and individual VMs; and support for Federal, Enterprise and other custom, high security deployments.

A policy manager module 236 of the CSB platform 202 enables (e.g., via the CSB platform access portal) implementation of various policies related to cloud services. Examples of such policies include, but are not limited to, pricing policies (discounts, upcharges, customer specific, partner specific, custom, etc); cost alerts based on thresholds; resource auto-scale policies (e.g., via support for a policy provider auto-scaling function); cost allocation policies by allocated and utilized capacity; architecture policies to enforce architectural constraints in solution design; and workflow/notification policies (e.g., email groups, portal tasks, order approvals, etc).

A broker operations module 238 of the CSB platform 202 enables (e.g., via the CSB platform access portal) implementation of broker operations related to cloud services. Examples of such broker operations include, but are not limited to, customer activations (i.e., on-boarding) and deactivation; customer subscription management (e.g., subscription packages and payment authorization); customer billing & payments with monthly bill export & import, bill lifecycle and publish, and credit card & purchase order support; brokerage command & control with visibility into cost, capacity & ordering behavior across providers & customers; customer support with integration and support ticketing systems; catalog implementation of services & providers, pricing rules, sourcing content, import SLAs and terms & conditions; channel/portal management with click-through agreements, white labeling/co-branding and affiliate management; and provider self-service with catalog & list price updates and visibility into customer behavior.

A cloud services integration module 240 of the CSB platform 202 enables (e.g., via the CSB platform access portal) implementation of cloud services integration functionalities (i.e., via adapters and application programming interfaces (API's)). Examples of such cloud services integration functionalities include, but are not limited to, pre-built jCloud API based adapters; built jCloud and REST API based adapters; support for custom adapters; adapters map to a common model for provisioning changes and asset discovery; metadata-driven configuration options enable dynamic UI for provider capabilities (e.g., memory, cpu, storage, OS templates); and map provisioning tasks to be automated or workflow-based.

A business systems integrations module 242 of the CSB platform 202 enables (e.g., via the CSB platform access portal) implementation of business systems integration functionalities (i.e., via API's). Examples of such business systems integration functionalities include, but are not limited to, APIs for business intelligence systems (e.g., resource capacity/cost/utilization for provisioned resources; catalog data, asset inventory data and orders; and the like); enterprise billing & payment systems that provide APIs for enterprise billing & payment systems to retrieve and update data for bills, orders and assets; and APIs for cloud service providers to manage catalog & list prices, terms and conditions for provider services and visibility into customer activity and behavior.

An IT systems integrations module 244 of the CSB platform 202 enables (e.g., via the CSB platform access portal) implementation of IT systems integration functionalities (i.e., via API's) related to internal IT governance, internal IT operations help desk systems, and internal data center systems management. Examples of such IT systems integration functionalities include, but are not limited to, providing APIs for enterprise governance systems to view order access and complete workflow tasks, review tickets/support, terms and conditions with SLAs; monitoring and auditing data for cost, capacity and utilization of resources; providing APIs for Help Desk systems to view, edit, submit and run reports on support tickets; providing APIs for enterprise systems management integration; and monitoring data for cost, capacity, and utilization of resources.

A cloud services network module 246 of the CSB platform 202 enables (e.g., via the CSB platform access portal) implementation of cloud services networking functionalities. Examples of such cloud services networking functionalities include, but are not limited to, pre-defined CSB service taxonomy (e.g., hierarchical); pre-loaded catalog(s) (e.g., for cloud providers, private clouds, security services, network services, managed services; pre-built adapters for available cloud service providers; pre-defined provisioning workflows for all services pre-loaded in the catalog(s); sourcing comparator content for cloud service provider offerings; pre-defined subscription packages; user roles and dashboards; pre-defined email templates for user registration, provisioning status, order status & process steps, alert notifications, and task notifications; and pre-built integration for support.

Figure 4:
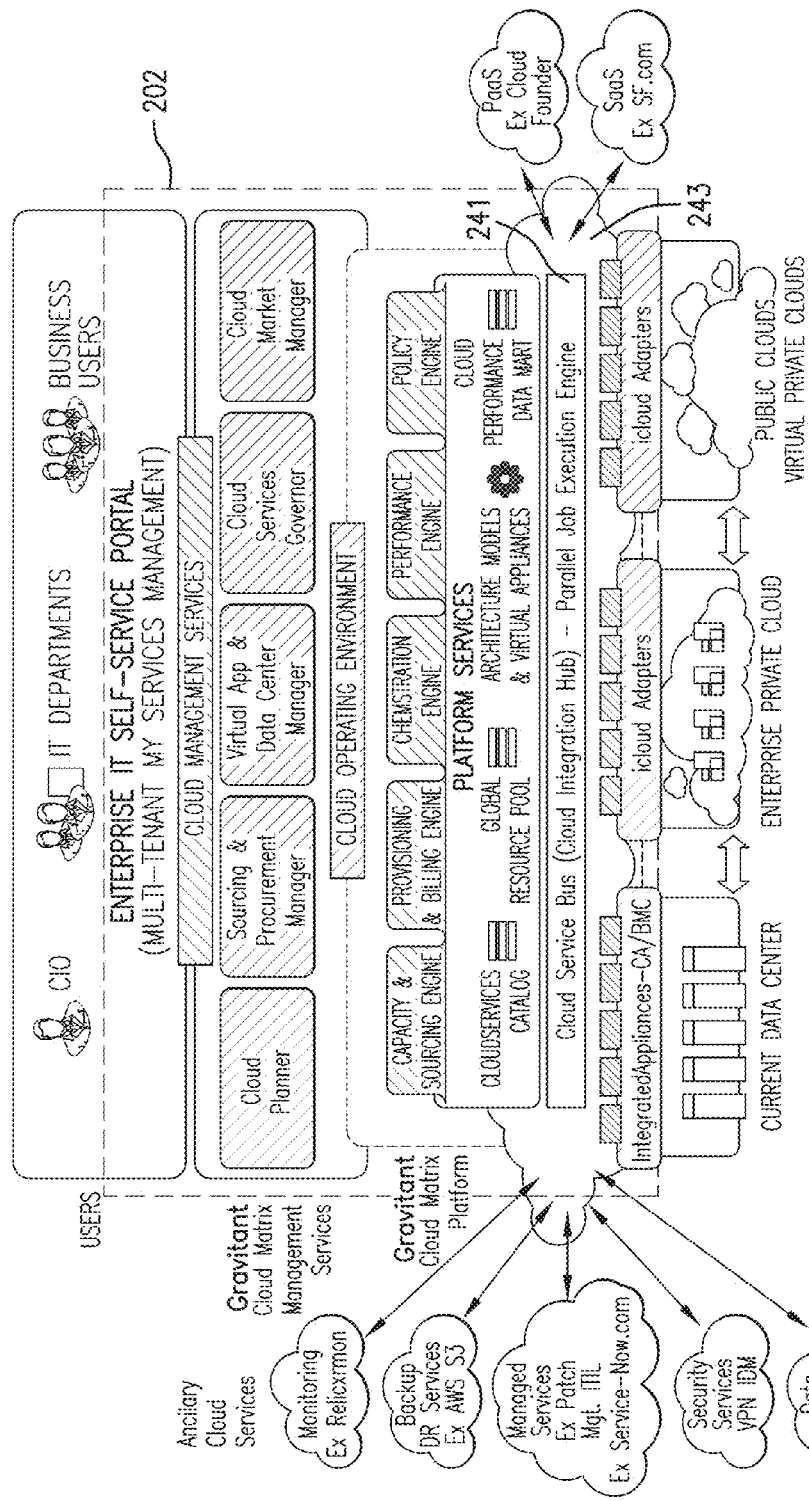
FIG. 4 is an illustrative view showing high-level functionality of the CSB platform of FIG. 3A.

Referring to FIG. 4, further details of the cloud services integration module 240 of the CSB platform 202 are presented. The cloud services integration module 240 shown in FIG. 3A comprises a unique and comprehensive service bus architecture for the provisioning capabilities. This service bus architecture is embodied by the cloud service bus 241, which is coupled to outside network 243. The cloud service bus 241 has an inbuilt data driven workflow/process engine that supports multiple workflow/process definitions for different services, service providers and/or service types. The cloud service bus 241 uses an adapter architecture pattern to integrate with service providers. The cloud service bus 241 is a message-based architecture that allows asynchronous and parallel execution of provisioning tasks across cloud services and cloud service providers. These provisioning adapters are separate 'classes/libraries' that implement specific provisioning APIs at the level of each operation mapped to the provider API. The adapter classes are implemented using the Interface design pattern. The cloud service bus 241 supports multiple adapter invocation approaches including standard web service protocols and REST API protocols, as well as custom approaches depending on the service provider capabilities.

The cloud service bus 241 can use standard open-source JClouds (jclouds) protocol that currently has provisioning integration enabled for about 30 cloud providers. The cloud service bus 241 workflows invoke jclouds protocol libraries using service provider metadata and credentials configured in the catalog discussed above (i.e., the service catalog).

The architecture of the cloud service bus 241 and the adapter pattern support several standards such as, for example, VMWare vCloud Director APIs, OpenStack APIs, AWS APIs, jclouds APIs, Eucalyptus APIs and CloudStack APIs. The cloud service bus 241 provides the unique ability to interoperate with emerging and changing standards with the cloud, and normalize across them from a consumer perspective. Many of these standards are focused on cloud provider's ease of management of multiple cloud technologies.

Users of the CSB platform 220 can design their virtual data centers through a visual user friendly console. Once the design is finalized, it goes through an authorization workflow, followed by an approvals process that is all fully automated through the CSB platform 220. Such an authorization workflow is critical to maintain complete control of the procurement process. Otherwise, resources may be ordered and provisioned randomly without proper protocol leading to rogue virtual machines and virtual machine sprawl. Next, all the virtual resources are simultaneously provisioned across multiple providers through the cloud services integration module 240, which has API connections to the different cloud service providers. Accordingly, cloud service consumers do not need to create accounts and communicate with multiple providers for their cloud requirements because this will be done for them automatically by the cloud services integration module 240. This level of automation also allows for easy movement of workloads between cloud service providers.

FIG. 3A shows a functional component architecture view of the CSB platform 202 of FIG. 4. Platform services of 202 shows the data repositories that power the various functional components of FIG. 3A. For example, Cloud Performance Datamart in 202 is updated and used along with Performance Engine and Cloud Services Governor in 202 by the Control Functional module in FIG. 3A; and the Cloud Services Catalog, Discovery and Asset Manager in FIG. 3A uses the Platform services of 202 Global Services Catalog, Global Resource Pool, and Architecture Models and Virtual Appliances, along with Virtual App and Data center Manager Functions shown in 202. The Cloud Services Network module in FIG. 3A represents the catalog content, templates and adapters built for the representative network of services shown in FIG. 4 outside 202 and connected to 202.

Figure 5:
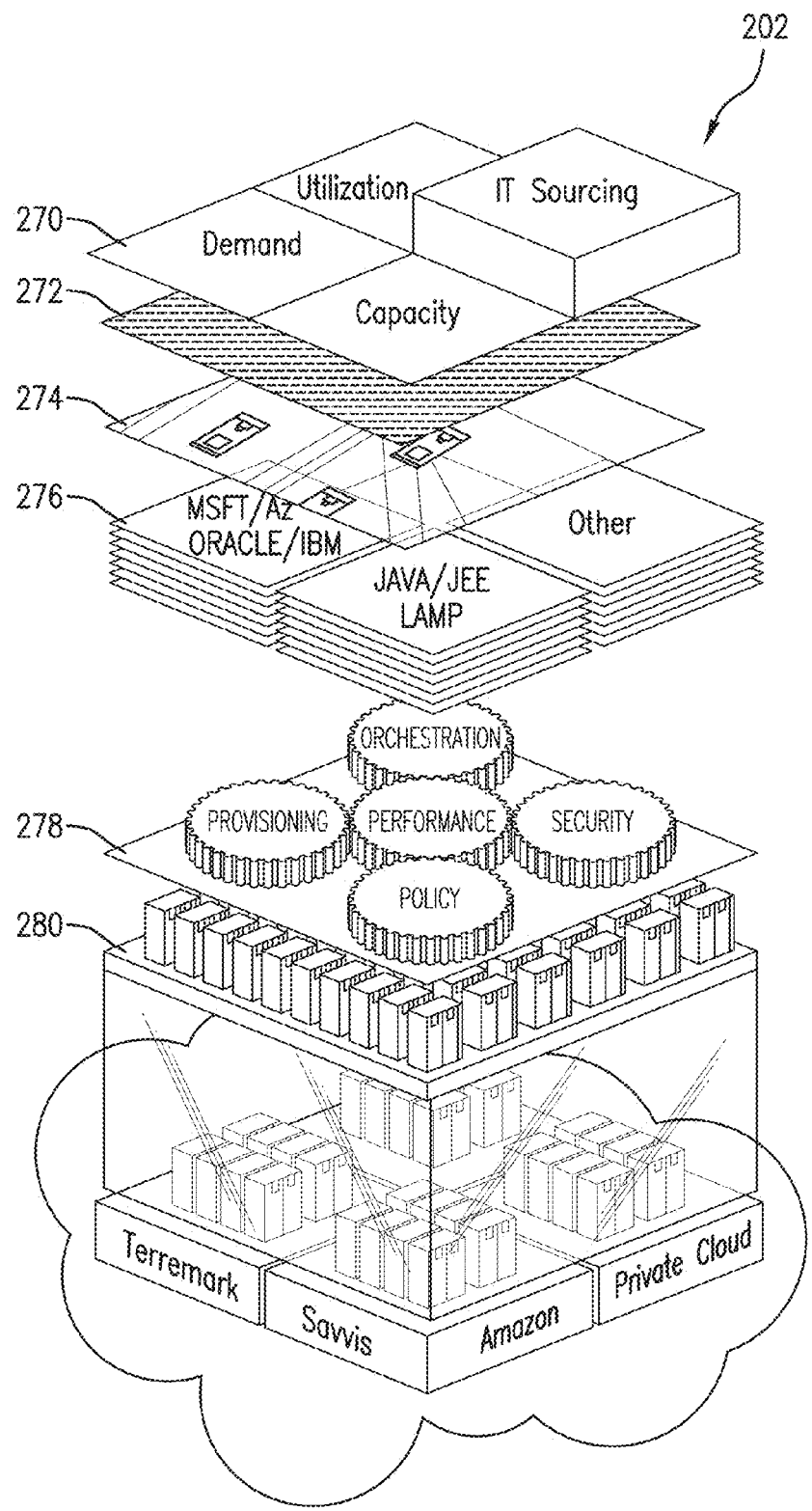
FIG. 5 is an architectural view showing various engines providing functionality the CSB platform of FIG. 3A.

FIG. 5 shows an architectural view of the CSB platform 202. The architecture of the CSB platform 202 enables cloud brokerage services to be delivered in a manner that provides advantageous and beneficial results. As is discussed below in reference to the various platform engines of the CSB platform 202, the architecture of the CSB platform 202 employs advanced simulation and optimization mathematical models for IT planning, sourcing, and governance.

A set of cloud decision and governance engines 270 of the CSB platform 202 is configured to simulate and optimize trade-offs between cloud service criteria such as, for example, business demand, resource capacity, utilization/ performance, and IT sourcing policies. The set of cloud decision and governance engines 270 enable the analysis of impacts to cloud service parameters such as, for example, cost, risk, QoS, SLAs, and application architecture for business services and applications. Based on these analyses, IT organizations and/or other entity(ies) of a cloud service consumer can make decisions on preferred cloud service providers to use, on the optimal cloud service capacity to deploy, and on the policies for automated scaling of capacity based on business demand. Thereafter, an IT organization and/or other entity(ies) of a cloud service consumer can govern the operations and compliance of these decisions through on-going tracking and analysis against a defined plan.

A cloud services catalog engine 272 of the CSB platform 202 is configured to manage a comprehensive model of public/private cloud services supply and business services demand of the cloud service consumer's. An administrative entity that manages back-end operability of the CSB platform 202 (i.e., the various platform engines thereof) works with many cloud service providers to model their individual cloud services and purchase-able line items with pricing and packaging structures. The cloud service consumer (e.g., its IT Organizations) can then define their business services and model demand for cloud services based on available services in a catalog of cloud services that are available from the cloud service providers (i.e., a CSB cloud services catalog). The cloud service consumer (e.g., its IT Organizations) can also define a custom catalog of preferred suppliers (e.g., a CSB cloud service provider catalog that can comprise the CSB cloud services catalog) to help manage their sourcing policies and setup a private marketplace.

A cloud performance data mart engine 274 of the CSB platform 202 is configured to automatically aggregate and correlate metrics for cloud service criteria such as, for example, demand, capacity, utilization, performance, cost, and risk for multiple application architecture and cloud resources across many environments and virtual data centers. The cloud performance data mart engine 274 enables near real-time visibility into resource performance along with audit data to manage governance of resource changes. Using a suitable performance data model, the system can scale to support thousands of resources with historical data and deliver instant reporting.

An application architecture manager engine 276 of the CSB platform 202 is configured to define application architecture blueprints using virtual appliances (e.g., templates) and associated resource capacity models to automate system construction, deployment, configuration and maintenance across physical, virtual and cloud environments. Also, the application architecture manager engine 276 enables orchestration and transaction-based automated provisioning of cloud resource changes.

A set of cloud architecture engines 278 of the CSB platform 202 provides a common set of architecture services to intelligently scale, monitor, and secure applications running across multiple cloud environments and internal data centers. The cloud architecture engines 278 provide the foundation, logic, and integrations to enable automated resource provisioning, performance management, orchestration and workflow, policy models, and security controls.

A global cloud resource pool and cloud service provider engine 280 of the CSB platform 202 is configured to create, manage and control VDC's by provisioning resources from multiple external cloud service providers, private clouds and internal data centers. All resources are inventoried globally across providers and manageable through a single unified interface. Cloud service providers are integrated into the CSB platform 202 through common interfaces (e.g., for connectors of VDC's and connectors of cloud managed services).

In view of the disclosures made herein, a skilled person will appreciate that a CSB platform configured in accordance with the present invention offers several distinguishing aspects with respect to traditional approaches for enabling a cloud services to be implemented by a cloud services consumer. One such distinguishing aspect relates to CSB functionality being configured for meeting end user cloud service consumption use cases integrated with governance use cases for IT and business managers. In this regard, such a CSB platform is configured to operate and scale across multiple agencies and internal/external cloud service providers communities in a centralized or federated deployment model. Another such distinguishing aspect relates to CSB platform being model driven and based on XML semantic ontologies. This avoids lock in for end customers while providing quick extensibility and integration with customers and cloud providers systems. Furthermore, the CSB platform includes integrated analytics and policy management for intelligent resource usage, SLA compliance, and cost optimization thereby allowing cloud service consumers to run predictive IT operations to optimize utilization cost and SLA across an IT supply chain. Yet another such distinguishing aspect relates to CSB platform being able to be deployed (i.e., onsite or offsite) in multiple configurations where an operator of the CSB platform can be an agency or a preferred service integration provider. Additionally, the processes implemented via the CSB platform inter-operate with service management and governance processes of other entities, which enables a staged extension of a non-broker-based operations model to a broker-based operations model.

Figure 6:
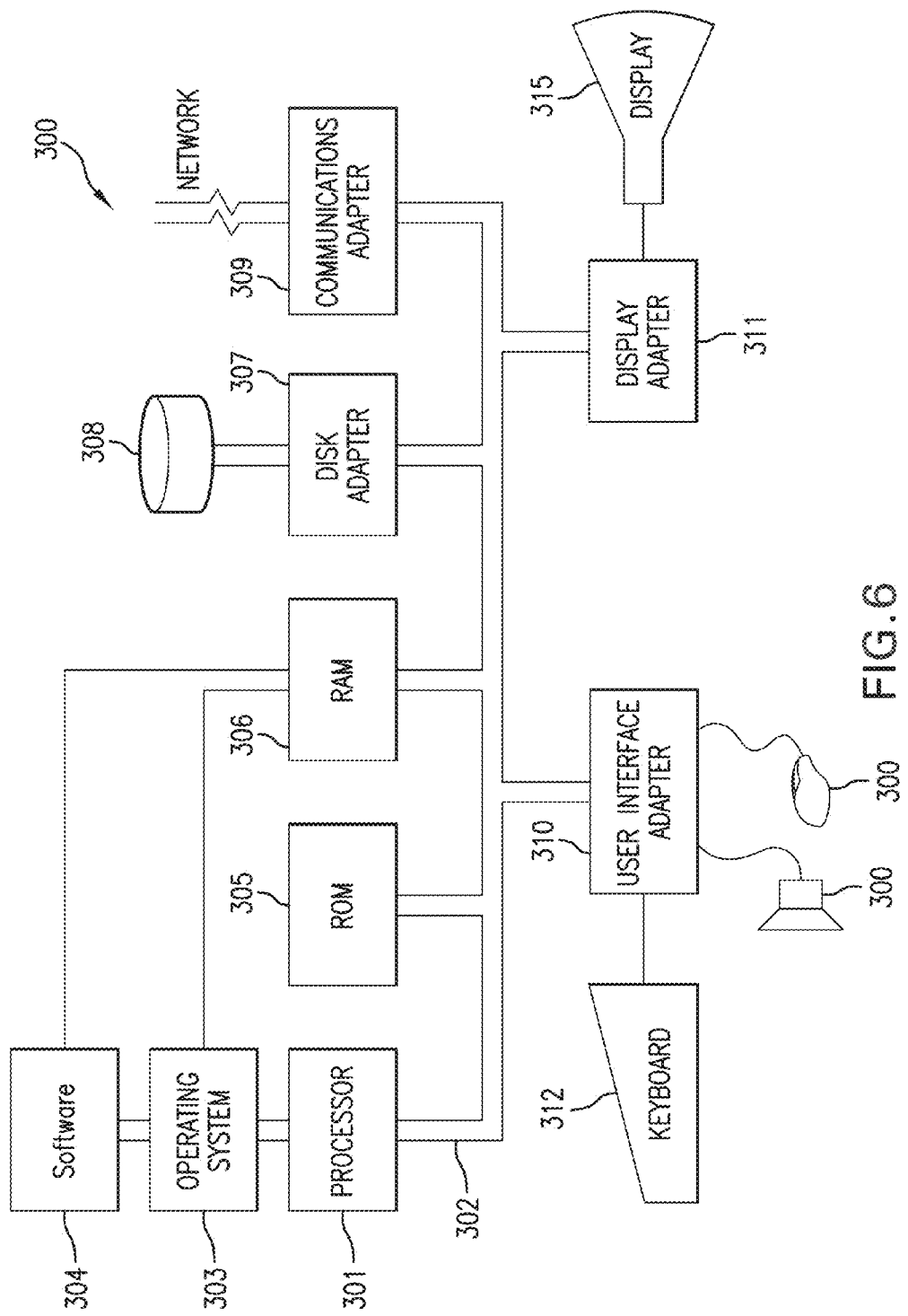
FIG. 6 is a block diagram showing a data processing system 300 representative of a hardware environment comprising a CSB platform configured in accordance with an embodiment of the present invention.

FIG. 6 shows a data processing system 300 representative of a hardware environment comprising a CSB platform configured in accordance with an embodiment of the present invention (e.g., the CSB platform 202). A server is one example of the data processing system 300. The data processing system 300 a processor 301 coupled to various other components by system bus 302. An operating system 303 runs on processor 301 and provides control and coordinates the functions of the various components of the data processing system 300. 2. Software 304 in accordance with the principles of the present invention runs in conjunction with operating system 303 and provides calls to operating system 303 where the calls implement the various functions or services to be performed by software 304 and, optionally, other applications. Software 304 includes a set of instructions (i.e., a program) for providing cloud service brokerage functionality configured in accordance with an embodiment of the present invention (e.g., as disclosed above in FIGS. 2-5).

Read-only memory ("ROM") 305 is coupled to system bus 302 and includes a basic input/output system ("BIOS") that controls certain basic functions of capacity planning system 104. Random access memory ("RAM") 306 and disk adapter 307 are also coupled to system bus 302. It should be noted that software components including operating system 303 and software 304 can be loaded into RAM 306, which may be the main memory of execution for the CSB platform 202. Disk adapter 307 may be an integrated drive electronics ("IDE") adapter that communicates with a disk unit 308, e.g., disk drive.

The data processing system 300 may further include a communications adapter 309 coupled to bus 302. Communications adapter 309 interconnects bus 302 with an outside network (e.g., outside network 243 shown in FIG. 4) enabling the CSB platform 202 to communicate with other devices.

I/O devices may also be connected to the CSB platform 202 via a user interface adapter 310 and a display adapter 311. Keyboard 312, mouse 313 and speaker 314 may all be interconnected to bus 302 through user interface adapter 310. Data may be inputted to the CSB platform 202 through any of these devices. A display monitor 315 may be connected to system bus 302 by display adapter 311. In this manner, a user is capable of inputting to the CSB platform 202 through keyboard 312 or mouse 313 and receiving output from the CSB platform 202 via display 315 or speaker 314.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) (e.g., non-transitory computer readable medium) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are/can be described herein with reference to textual descriptions, flowchart illustrations and/or block diagrams of methods, apparatus (systems) and computer program products according to embodiments of the present invention. It will be understood that portions of the textual descriptions, flowchart illustrations and/or block diagrams, and combinations thereof can be implemented by computer program instructions. These computer program instructions may be provided to a processor of a general purpose computer, special purpose computer, or other programmable data processing apparatus to product a machine, such that the instructions, which execute via the processor of the computer or other programmable data processing apparatus, create means for implementing the function/acts specified in the textual descriptions, flowchart illustrations and/or block diagrams, and combinations thereof. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the textual descriptions, flowchart illustrations and/or block diagrams, and combinations thereof. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the textual descriptions, flowchart illustrations and/or block diagrams, and combinations thereof.

CSB Platform User Interface

Figure 7:
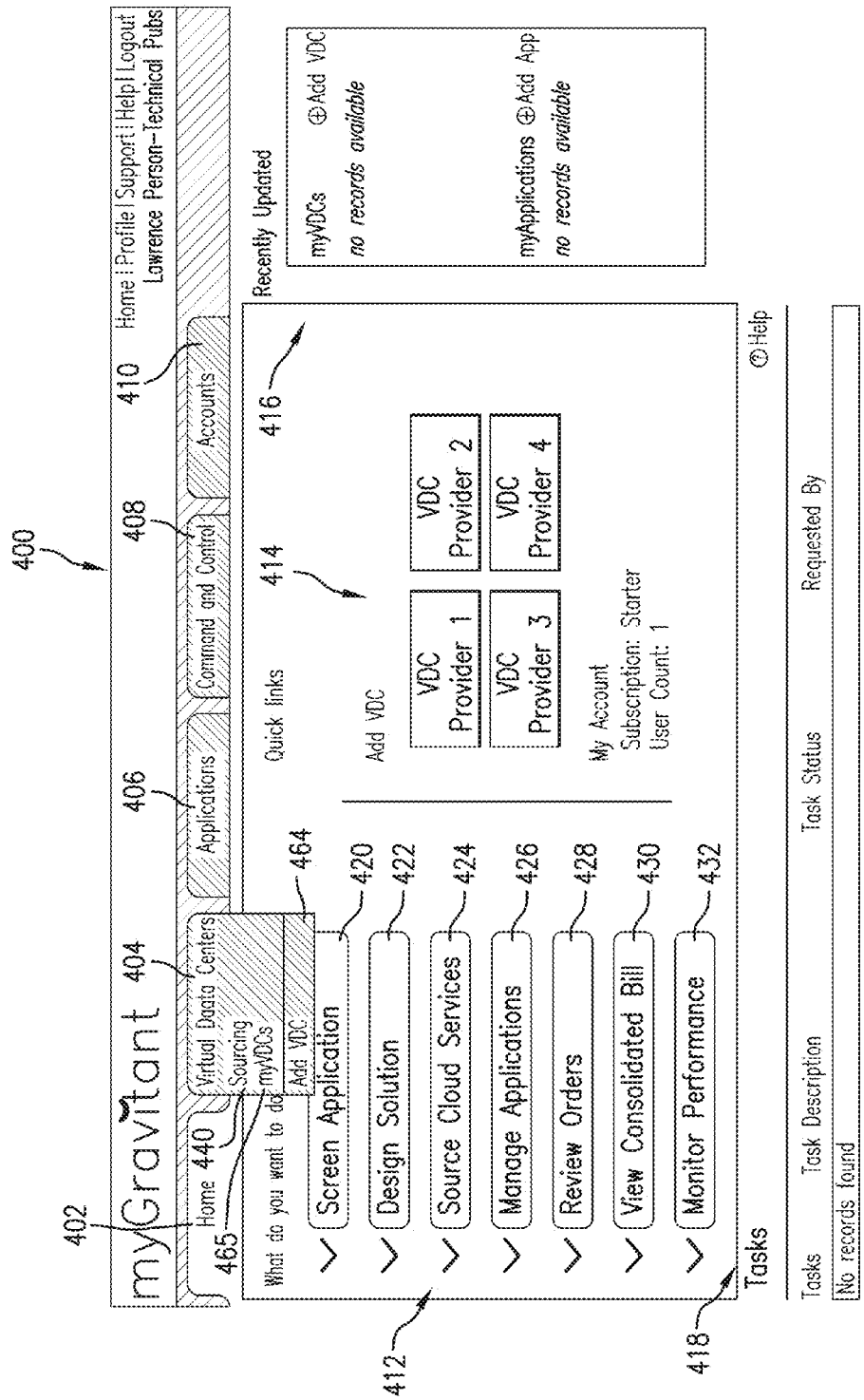
FIG. 7 is an illustrative view of a home page of a CSB platform portal configured in accordance with an embodiment of the present invention.

Turning now to specific aspects of cloud management interface functionalities, FIG. 7 shows a main user page 400 of a portal configured in accordance with an embodiment of the present invention (e.g., a portal of the CSB platform 202 discussed above). The main user page 400 includes a Home tab 402, a Virtual Data Center (VDC) tab 404, an Applications tab 406, a Command And Control tab 408, and an Accounts tab 410. The Home tab 402 enables navigation to specific functionalities (e.g., those of other navigation tabs) and to consumer task activities. The VDC tab 404 provides functionalities related to comparing different cloud service providers and to creating and managing VDCs and other virtual resources. The Applications tab 406 provides functionalities related to creating, sizing, editing and managing the consumer's cloud applications, which can be mapped to resources within a single VDC or across multiple VDCs. The Command And Control tab 408 provides functionalities related to viewing and managing the consumer's orders, view monthly consolidated bills and to monitoring its VDCs and applications. The Accounts tab 410 provides functionalities related to creating and editing users of the consumer's cloud services, assigning roles to its users and managing its users. In this regard and as will be discussed below in greater detail, each one of the tabs 402-410 provides a cloud services consumer access to respective information and functionalities.

Home Tab

The Home tab 402 includes a Tab Link section 412, a VDC Quick Link section 414, a Recently Updated Resource section 416, and a Tasks section 418. The Tab Link section 412 provides selectors for accessing respective functionalities, as discussed below. The Quick Links section 414 provide shortcuts to create VDCs with the selected providers. The Recently Updated Resource section 416 links provide shortcuts to the IT Architecture view of recently created/updated VDCs and applications. The Tasks section 418 is a task manager that lists all pending tasks and providing links to order details where action is needed.

A screen application selector 420 of the Tab Link section 412 links (i.e., navigates the interface to) to functionalities for screening application for determining migration considerations, as is discussed below in reference to FIG. 19. A design solution selector 422 of the Tab Link section 412 links to an application solution designer view of the Applications tab 406 for enabling a user (i.e., cloud service user) to plan cloud resource scenarios by creating one or more applications (i.e., use specific cloud resource configurations) and mapping the one or more applications to different virtual data centers to compare and choose a desired cloud service solution (i.e., cloud service provider offering(s)). A source cloud services selector 424 of the Tab Link section 412 links to provider offering of the VDC tab 404 for enabling a user to compare provider packages and features to determine which provider to select. The objective of such comparison and determination is map application requirements to a package and use that package to compare which cloud service provider the user want to select (i.e., not yet actually buying, provisioning or fulfilling these packages). A manage applications selector 426 of the Tab Link section 412 links to an application screen (e.g., My Applications screen) of the Applications tab 406 for enabling a user to create applications and map them to a VDC or make edits to existing applications. A review orders selector 428 of the Tab Link section 412 links to an order screen (e.g., My Orders screen) of the Command And Control tab 408 for enabling a user to simultaneously view multiple orders across VDCs, to monitor their status, and to see the history of orders associated with their existing VDCs. A consolidated bill selector 430 of the Tab Link section 412 links to a list of bills currently in pending for the cloud service consumer for enabling a user to navigate to detail information for a particular bill. A monitor performance selector 432 of the Tab Link section 412 links to a monitoring screen of the command and control tab 408 for providing access to dashboard that provide information relating to cost and performance of a user's VDCs and Applications.

VDC Tab

The VDC tab 404 (FIG. 7) provides functionalities related to comparing VDC packages, creating new VDCs, and monitoring relationship between applications and VDCs. As discussed below in greater detail, creating VDCs entails creating resources on-demand and managed as a pool of virtual resources and controlled through the portal (i.e., an online user interface). Instead of ordering specific line items from a catalog, a VDC is designed with capacity and/or virtual resources and then the CSB platform automatically generates an order for a selected cloud service provider to fulfill the ordered VDC design.

Figure 8A:
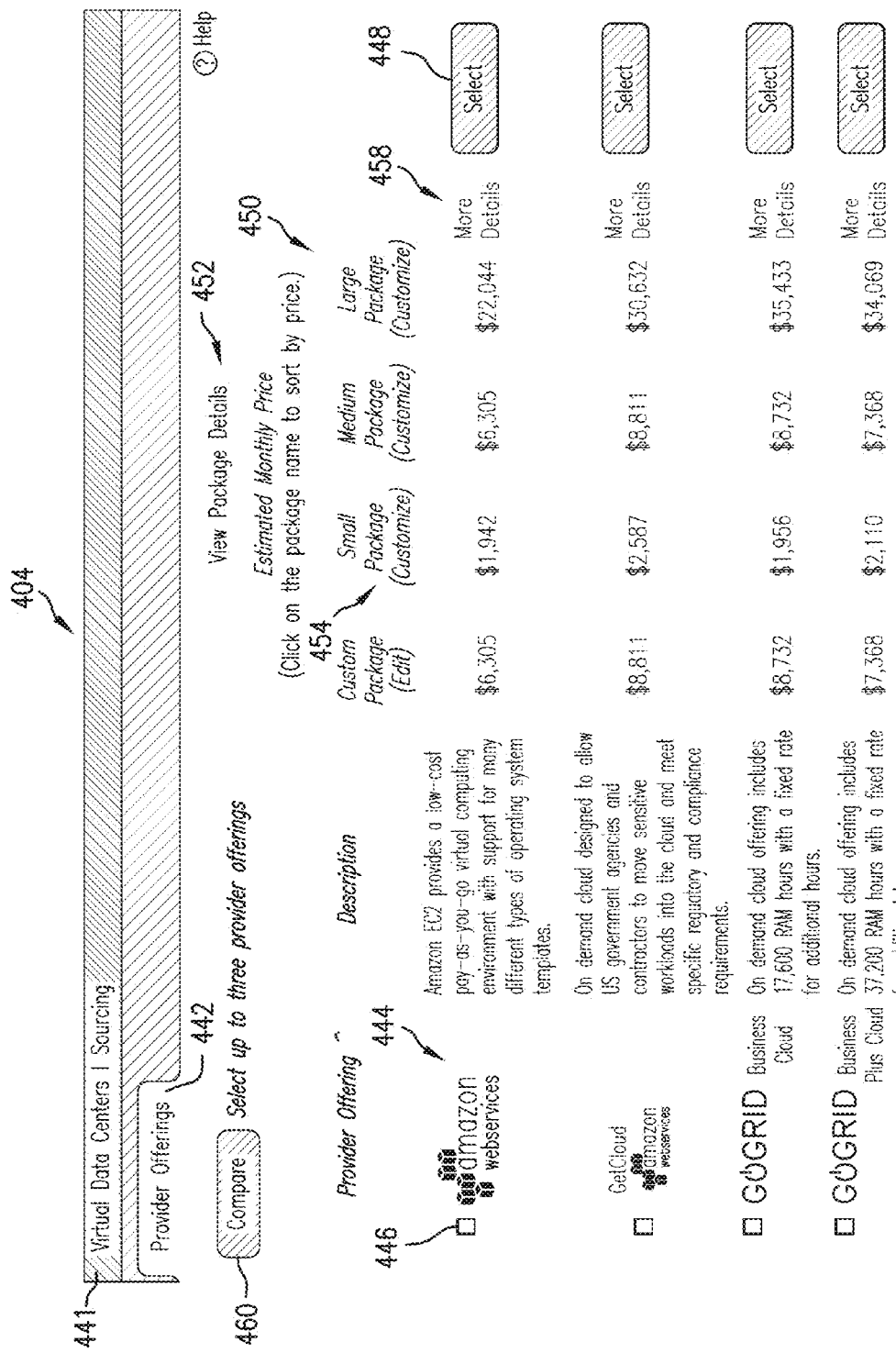
FIG. 8A is an illustrative view of a cloud services sourcing screen of a CSB platform (e.g., a portal thereof) configured in accordance with an embodiment of the present invention.

A sourcing selection 440 (FIG. 7) of the VDC tab 404 takes the user to a sourcing section 441 of the VDC tab 404 for allowing the user to compare cloud provider packages (i.e., VDC package offerings) at a Provider Offering screen 442 (FIG. 8A). At this stage, a user (i.e., a cloud services consumer) is not actually buying, provisioning or fulfilling these packages, but is attempting to identify or map its requirements to a package and use that package to compare which cloud service provider to select. Referring now to FIG. 8A, the user chooses available packages 444 to be compared by selecting (i.e., checking) a plurality of provider offering boxes 446 and then clicks a Select button 448 next to a selected provider offering 444 to bring up the VDC ordering popup with the configuration values already pre-populated. Clicking the Select button 448 simply pre-populates the configuration values in VDC Order screen(s) to enable the comparison and allows the user to specify a package configuration. Each package configuration 450 has an estimated price (e.g., monthly, quarterly or annually) shown. Examples of the package configurations include, but are not limited to, a custom package, a small package (e.g., a relatively small cloud), a medium package (i.e., a medium size cloud), and a large package (i.e., an enterprise level cloud). The used can click a View Sample Solution Package Details button 452 or any package column row header 454 to bring up package details. Each available package has a description 456 of the provider offering 444. For a more detailed description, a user can select a More Details button 458 to cause additional information (i.e., specific package configuration information) on the provider offering 444 to be displayed (i.e., outputted).

Figure 8B:
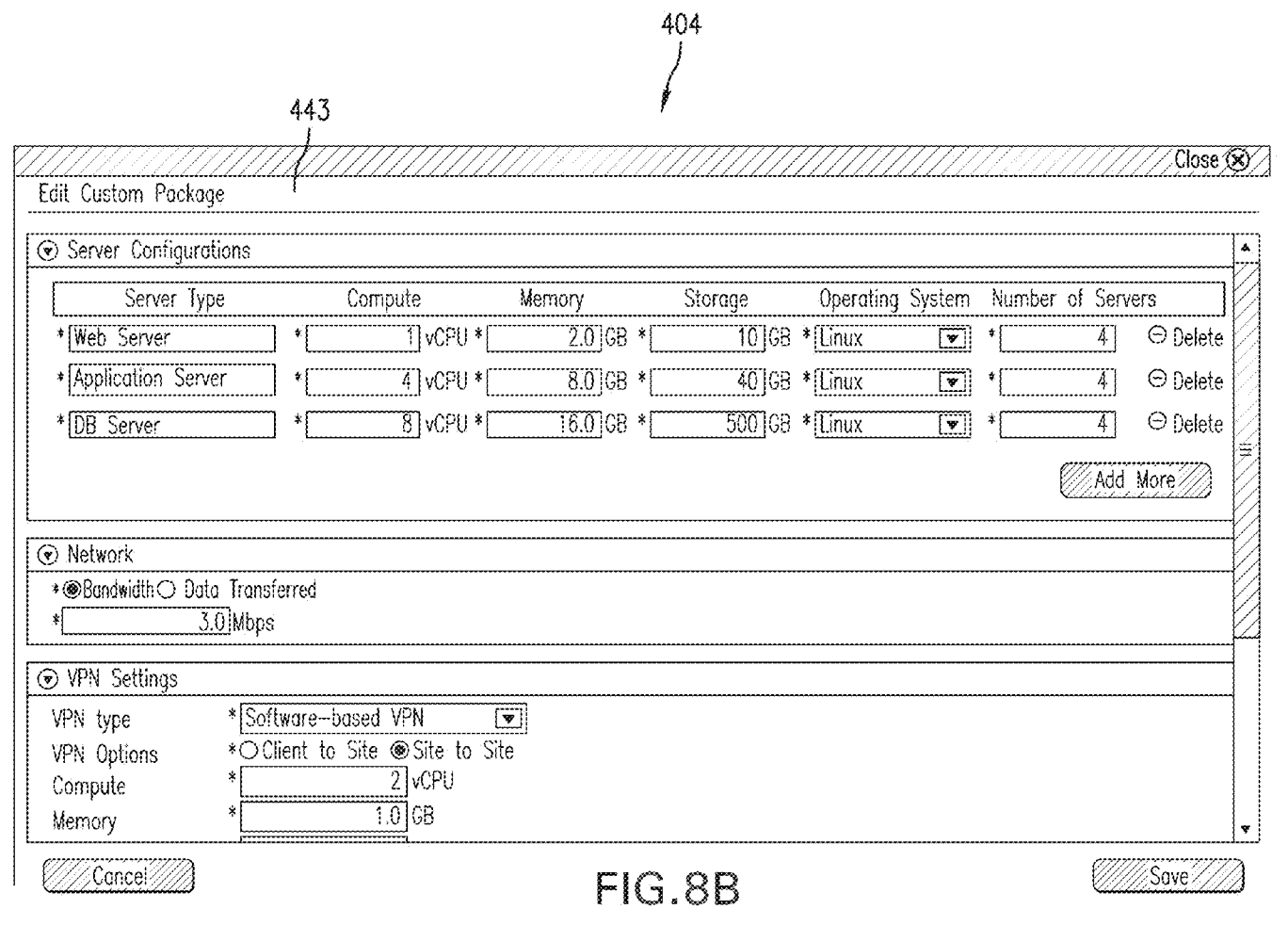

As shown in FIG. 8B, the user creates the custom package through use of a custom package editing screen 443. The custom package can be created by choosing to customize one of the pre-configured packages (e.g., small, medium or large package) on the Provider Offering screen 442 whereby the package customization process entails starting with all or certain package configuration parameter fields of the custom package editing screen 443 populated with configuration parameters based on a selected pre-configured packages and the user editing the configuration parameter of all or a portion of the package configuration parameter fields. Alternately, the custom package can be created by from the ground up whereby the package customization process entails starting with all or certain package configuration parameter fields of the custom package editing screen 443 empty and the user editing the configuration parameter all or a portion of the package configuration parameter fields.

Figure 9:
FIG. 9 is an illustrative view of a cloud services provider comparison screen of a CSB platform (e.g., a portal thereof) configured in accordance with an embodiment of the present invention.

To compare the selected ones of the provider offerings 444 (i.e., those with the provider offering boxes 446 checked), the user clicks the compare button 460 thereby causing a Provider Offerings Comparison screen 457 to be displayed (FIG. 9). Referring now to FIG. 9, the Provider Offerings Comparison screen 457 allows the user to compare a plurality of provider offerings (e.g., up to 3) in a side-by-side manner with key features highlighted for each provider offering. Choosing the select button 462 on the Provider Offerings Comparison screen 457 causes the user to be directed to a VDC Ordering Pop-up screen (not shown) with the configuration values already pre-populated based on your selection.

Comparisons between provider offerings can be sorted into broad categories of usage for Small, Medium, and Large VDCs. For example, if the user is running a public catalog website, it may need only two application servers, one database server, and one VPN server, whereas an enterprise-class application with thousands of concurrent users may have 20 web servers, 20 application servers, 12 database servers, and 8 VPN servers, with vastly increased memory, CPU, network, and storage requirements. It is acceptable for the users exact requirements to vary from a particular the sample package. The user can simply pick the package that is closest to its needs and alter that package as part of the design process that is similar to the Add New VDC process discussed below.

Examples of comparison parameters include, but are not limited to, Description (e.g., a brief description of the provider offerings); Virtual Machine (e.g., summary of the RAM (in GB), CPUs, and local storage (usually in GB) included in the provider offering, which can be adjusted later during an Add Resource Group process); Network (e.g., overview for the bandwidth, VLANs, minimum guaranteed throughput, pricing model for network traffic, server load balancer and private network provisions for the provider offerings); Storage (e.g., overview of the architecture, snapshots, backup policy, and shared storage for the provider storage offerings); Security (e.g., summary of firewall and intrusion detection/prevention for provider offerings); SLA (e.g., what uptime does the provider guarantee for their offering).; Operating System (e.g., which operating systems the provider has available for its VMs, particular variety of OS, any restrictions on uploading your own image to a "blank" server); Provisioning Time (e.g., time for the provider to provision VDCs and VMs, which frequently can assume that configuring the first VDC created will take more time than subsequent VDCs); Support (e.g., provider support policies); Location (e.g., Geographical location of the provider's physical data center); and Pricing (e.g., Provider pricing for small, medium and large packages). The values of comparison parameters represent entries of a particular service e provider offering in a catalog (e.g., service provider offering portion thereof) configured in accordance with an embodiment of the present invention.

Application Screening Functionality

Figure 10:
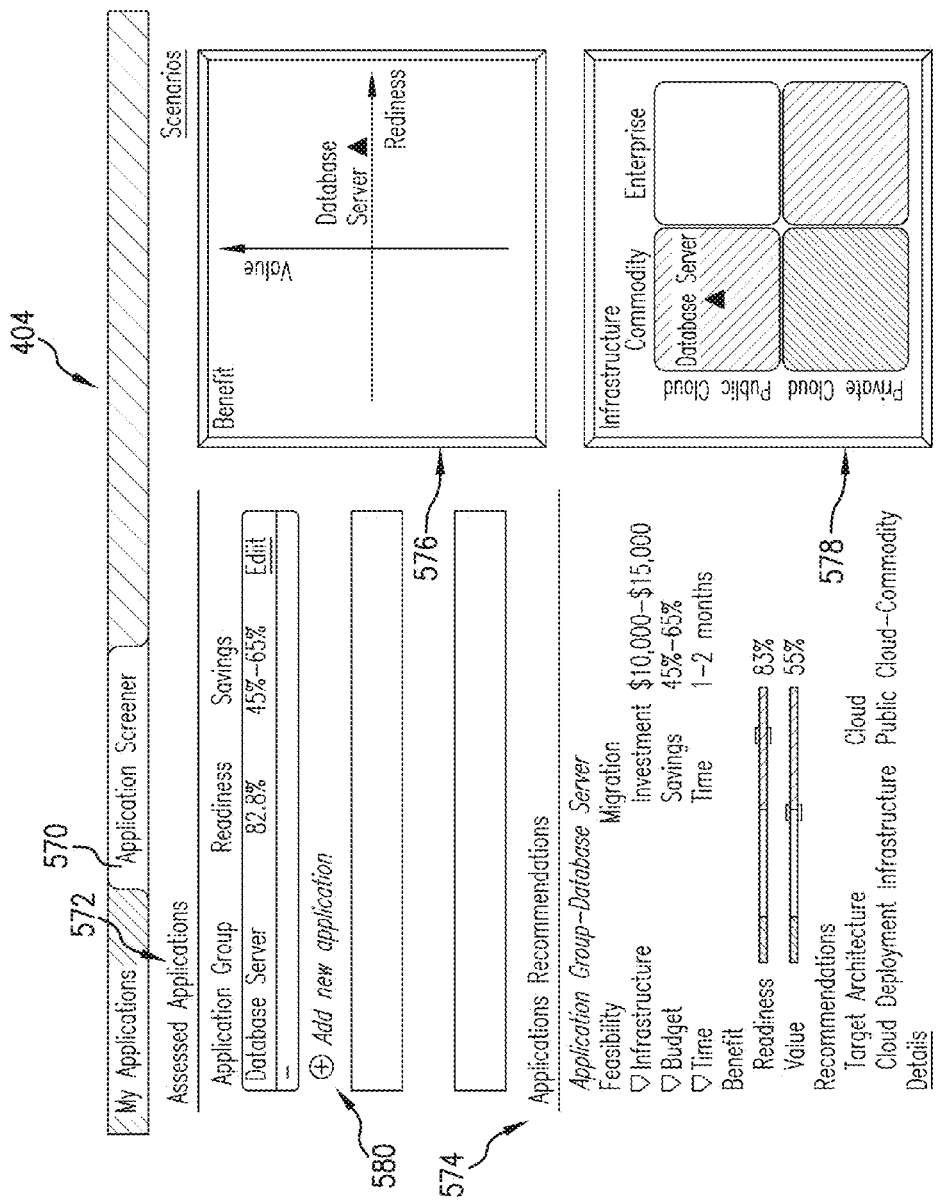
FIG. 10 is an illustrative view of an application screener configured in accordance with a first embodiment of the present invention.

The Applications tab 406 provides functionality for determining whether or not an application of a user (i.e., a cloud service consumer) is a good candidate to migrate to a cloud, as well as whether the user is ready to make that transition. This functionality is embodied in the Applications tab 406 (e.g., in the myApplications section 550) as an application screener 570, as shown in FIG. 10, which is an applications screener configured in accordance with a first embodiment of the present invention. It is disclosed herein that a CSB platform configured in accordance with an embodiment of the present invention can comprise an application screener such as, for example, the application screener disclosed in reference to FIG. 10.

The application screener 570 includes a portion for assessing applications (i.e., an application assessing portion 572), a portion for presenting application recommendations (i.e., an application recommendations portion 574), a portion for visually depicting application migration recommendation (i.e., an application migration chart 576), and a portion for visually depicting recommended cloud architecture for supporting migration of the application (i.e., a migration infrastructure chart 578). The application assessing portion 572 enables a user to subject an application to an assessment process for determining migration factors such as, for example, a relative migration readiness and a relative migration savings. The application recommendations portion 574 presents recommendation information for an application selected within the application assessing portion 572.

Examples of the recommendation information include, but are not limited to, information related to migration feasibility relative to infrastructure, budget, and deployment time; information quantifying cost of migration, savings from migrating, and time to implement migration. The application migration chart 576 depicts a relative benefit of migrating the application with regard to readiness and value. The migration infrastructure chart 578 depicts a recommended infrastructure for migrating the application with regard to level of cloud (e.g., commodity or enterprise) and type of cloud (e.g., public or private).

Selecting an Add New Application field 580 in the an application assessing portion 572 of the application screener 570 initiates an application assessment process for evaluating migration of a particular application. In response to selecting the Add New Application field 580, a plurality of steps are performed for providing information upon which the application will be assessed. Examples of this information include, but are not limited to, application name; application category; number of concurrent users the application supports; annual growth rate for the application; demand variability if application demand varies by time of day, day of week, week or month, and/or month of year; location details including geographical dispersal, use of mobile apps (e.g., whether the user's organization functions independently or is susceptible to power outages or disasters); if the application is dependent on other upstream applications; the application platform (e.g., x86, Sun Sparc, PowerPC, and/or Mainframe) and the application OS (e.g., Linux, Windows, AIX, Solaris, and/or HP UX); if the online architecture is web-based, client-server or mainframe with terminal emulation; if the batch architecture is homogenous or heterogeneous with the online architecture; how many servers are required for each of development, test, production and disaster recovery environments; additional storage needs; bandwidth needs; required network reliability; time frame for migration; estimated budget for the migration; IT staff headcount; if a cloud migration strategy and/or organization exists; if the user's financial department has been updated to support a Cloud strategy; is there are any basic cloud monitoring tools in place and if they are across applications and systems; if there is a central configuration and management tool in place; if there is auto-provisioning and deployment governance tools in place; if the user own all hardware; if hardware is/will be located onsite or offsite; and if data is/will be onsite or offsite. The specific information for which the user is queried will be dependent on the specific implementation of the application assessment process.

Referring now to FIGS. 11-16, an application screener configured in accordance with a second embodiment of the present invention is shown (i.e., the application screener 600). Specifically, FIGS. 11-16 show an embodiment of a process for assessing an application in regard to deployment within a cloud environment. It is disclosed herein that a CSB platform configured in accordance with an embodiment of the present invention can comprise an application screener such as, for example, the application screener disclosed in reference to FIGS. 11-16.

An application page 601 of the application screener 600 includes an application selection field 603, a plurality of assessment category tabs 604-612, an assessment information field 614, and an assessment results field 616. Each one of the assessment category tabs 604-612 is related to a respective aspect of assessment of an application. The assessment information field 614 allows a user completing the assessment to input responses to information requests (e.g., requests for information in the form of system-determined questions) upon which results from assessment of the application are based. Each one of the assessment category tabs 604-612 is selectable and the information communicated through the assessment information field 614 is dependent upon a particular one of the assessment category tabs 604-612 that is currently selected. More specifically, the information requests presented to the user are dependent upon the selected tab and some or all of the information requests can chosen dependent upon the response given by the user to one or more previously responded to information requests. The assessment results field 616 presents information characterizing the results of the assessment of the application.

The technical assessment tab 604 includes assessment aspects relating to architecture and system design details of an application that is being assessed. The workflow profile tab 606 includes assessment aspects relating to functionality and operational details of the application. The organizational assessment tab 608 includes assessment aspects relating to internal organizational details of the entity having authority/control of moving the application to the cloud environment. The provider requirements tab 610 includes assessment aspects relating to requirements and expectations of a cloud provider should the application be moved to a cloud environment. The review tab 612 presents any information required for ensuring that necessary information has been received from the user in response to questions presented in association with selection of the technical assessment tab 604, the workflow profile tab 606, the organizational assessment tab 608, and the provider requirements tab 610.

For each one of the assessment category tabs 604-612, information requests associated with the assessment aspects of a currently selected one of the assessment category tabs 604-612 are presented to the user and one or more fields are provided for responding to such information requests. In preferred embodiments of the present invention, some of the information requests are chosen for being presented to the user dependent upon the response given by the user to one or more previously responded to information requests of the currently selected one of the assessment category tabs 604-612 and/or a different one of the assessment category tabs 604-612 through which one or more responses to an information request has been provided.

Examples of the architecture and system design details for which information requests relate in the technical assessment tab 604 include, but are not limited to, server (i.e., system) architecture (e.g., mainframe, client-server, web-based), system tiers, network architecture (e.g., internal communication, external communication, bandwidth, etc), storage architecture (e.g., local storage, shared storage, etc), system framework (e.g., parallelization, platform customization, and the like. Examples of the functionality and operational details for which information requests relate in the workflow profile tab 606 include, but are not limited to, application profile (e.g., application workflow type, application age, application complexity, application user experience, application scalability, application interoperability, etc), demand profile (e.g., demand trends/utilization, demand spread, etc) and the like. Examples of the internal organizational details for which information requests relate in the organizational assessment tab 608 include, but are not limited to, cloud strategy (e.g., budget, staff, deployment timeline, etc), application lifecycle (e.g., technology refreshment, contracts terms, etc) and the like. Examples of the cloud provider requirements and expectations for which information requests relate in the provider requirements tab 610 include, but are not limited to, infrastructure (e.g., location, sharing, etc), cloud features (e.g., spin-up time, capacity bursting, storage scaling, international capability, Internet downloading capacity, operating system licensing, etc), security (e.g., user authentication, network and data encryption, intrusion protection/OS vulnerability, etc), miscellaneous (e.g., cloud location, performance, compliance, etc) and the like.

Figure 11:
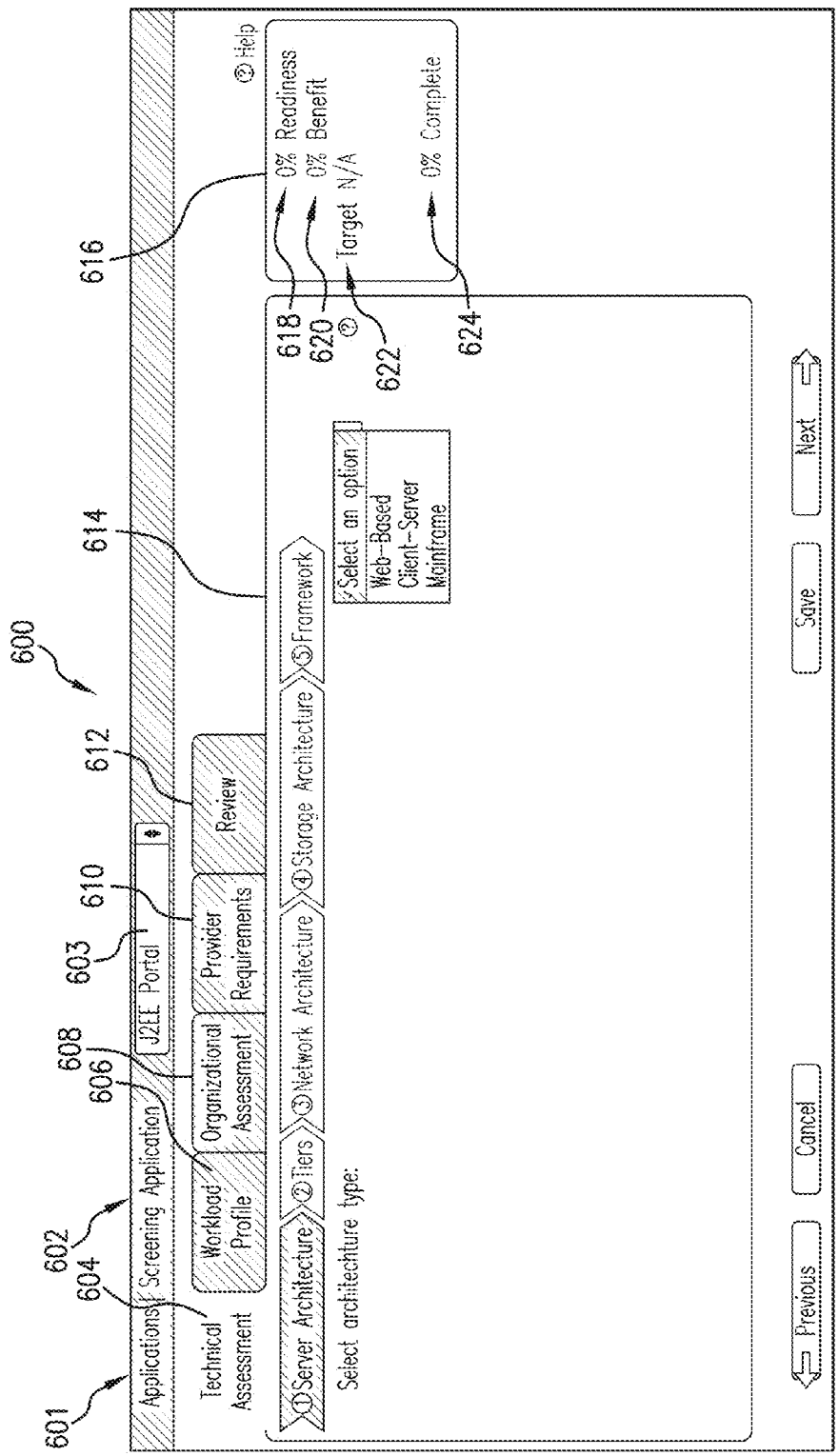
Figure 13:
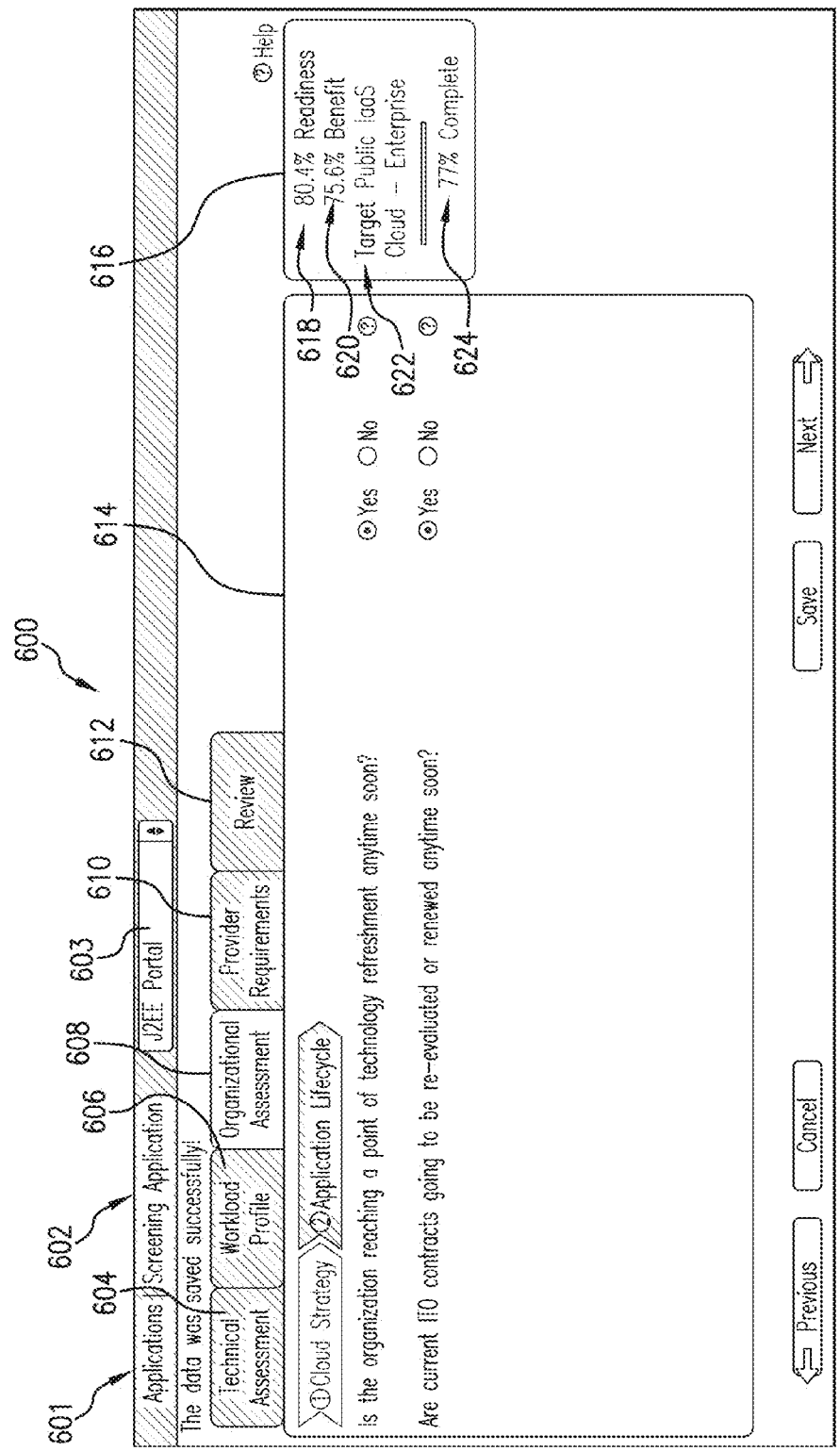

As shown in FIG. 11, the assessment results field 616 includes a variety of assessment results that characterized attributes associated with deployment of an application within a cloud environment. As depicted, the assessment results include, but are not limited to, a value characterizing a state of being prepared for operation in the cloud (driven by architecture feasibility, platform/OS popularity, and application complexity) (i.e., the readiness index 618), a value characterizing a degree of improvement derived by operating in the cloud (e.g., driven by TCO savings, application performance, and network performance) (i.e., the benefit index 620), a deployment model that is deemed best suited for the application (i.e., the target deployment model 622), and a value characterizing a degree of completion of the assessment (i.e., the assessment completion value 624). A higher readiness index refers to there being less effort needed for deployment of the application within the cloud environment and a higher benefit index refers to there being better agility once the application is in the cloud environment. The readiness index 618, the benefit index 620, the target deployment model 622, and the completion value 624 jointly represent result field content.

As indicated in FIGS. 11-14, as assessment of an application is performed, the result field content changes. The assessment completion value 624 indicates a relative degree of completion of the assessment such as by a combined evaluation of information requests already responded to, information requests yet to be responded to, and technical assessment tabs for which all necessary responses have been provided. When the assessment is indicated as being 100% completed (shown in FIG. 14), the readiness index 618, the benefit index 620, and the target deployment model 622 each indicate a respective result from the assessment. Furthermore, as can be seen in FIGS. 11-14, information comprising the readiness index 618, the benefit index 620 and the target deployment model 622 and the assessment completion value 624 is updated as the user provides responses to various information requests. In this regard, the user is provided with up to date result field content as responses to the information request of the various are provided and/or with completion of responses for each of the assessment category tabs 604-612.

Figure 15:
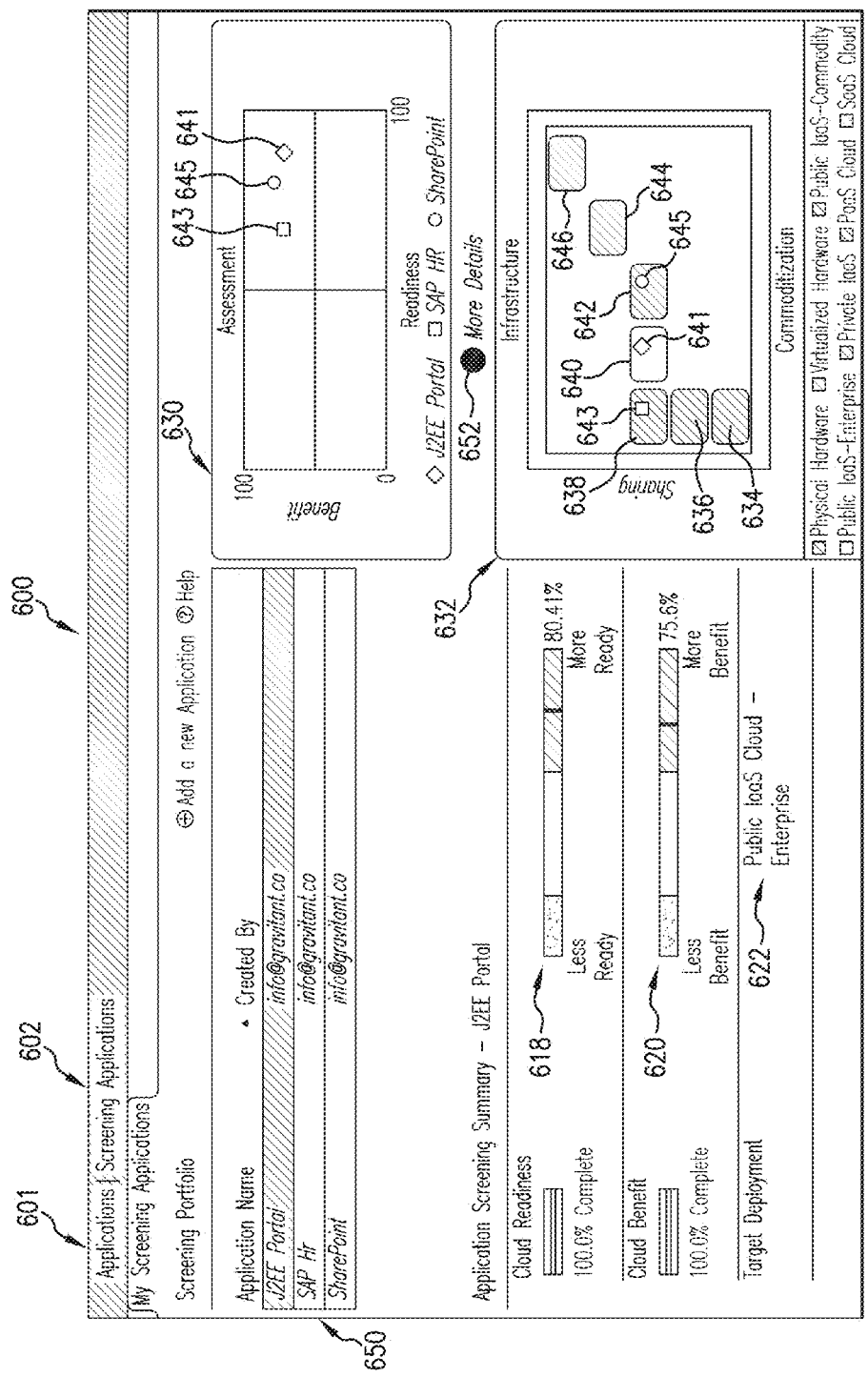

Referring now to FIG. 15, a screening application page 602 of the application screener 600 includes an expanded view of the result field content. An application assessment chart 630 (e.g., also referred to as a migration chart or deployment chart) depicts a relative benefit of cloud deployment of assessed applications with regard to readiness (i.e., readiness index increasing from left to right) and benefit (i.e., benefit index increasing from bottom to top). A target infrastructure chart 632 depicts a recommended infrastructure for deployment the assessed applications with regard to level of cloud sharing (i.e., degree of sharing increasing from bottom to top) and type of cloud commoditization (i.e., degree of commoditization increasing from left to right). The depicted target deployment infrastructures include, but are not limited to, physical hardware 634, virtualized hardware 636, private IaaS 638, public IaaS-enterprise 640, public IaaS-commodity 642, PaaS cloud 644, and SaaS cloud 646.

As an example of the utilization and resulting benefit of the application screener 600, still referring to FIG. 15, three applications are shown as having been assessed (i.e., assessed applications) and their results presented in the application assessment chart 630 and the target infrastructure chart 632. These assessed applications are: J2EE Portal application 641, SAP HR application 643, and SharePoint application 645. As can be seen, all three of the assessed applications are located in the top right quadrant of the application assessment chart 630, which indicates that all of the assessed applicants would be a good fit for the cloud based on their respective benefit and readiness indexes. As can also be seen, the J2EE Portal application 641 and the SharePoint application 644 dominate the SAP HR application 643. This dominant characterization is because the J2EE Portal application 641 and the SharePoint application 645 both have a higher readiness index and higher benefit index compared to the SAP HR application 643. Due to this dominance, which is also known as an efficient frontier, the J2EE Portal application 641 and the SharePoint application 645 should be given priority for cloud migration over the SAP applications 643. Next, using the target infrastructure chart 632, the target infrastructure of the J2EE Portal application 64 and the SharePoint application 645 should be considered before selecting a first one of the applications for deployment. As shown in the target infrastructure chart 632, it is recommended for the SharePoint applications 645 to be deployed on a Public IaaS Commodity cloud and for the J2EE Portal applications 641 to be deployed on a Public IaaS Enterprise cloud. Because commodity clouds are cheaper than enterprise clouds, deployment of the SharePoint application 645 on the Public IaaS Commodity cloud represents the preferred efficient frontier deployment.

Figure 16:
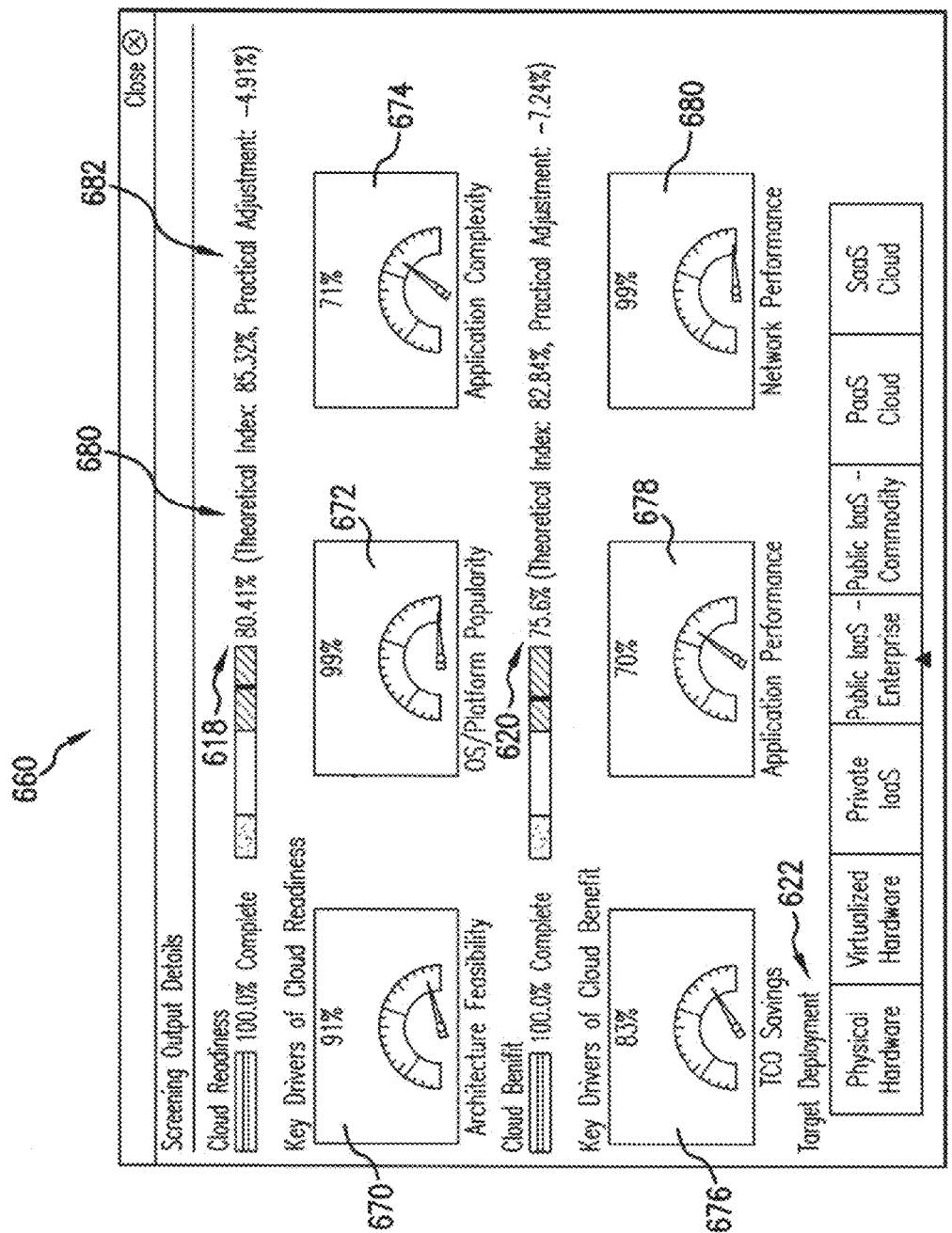

Referring now to FIG. 16, a screening outputs detail page 660 is shown. The screening outputs detail page 660 shows further detail of assessment of a selected one of the assessed applications. The selected one of the assessed applications can be chosen by selecting the corresponding application name in the screening portfolio section 650 of the screening application page 602 and then requesting more detail (e.g., by choosing "more detail selector" 652 on the screening application page 602 shown in FIG. 15). The screening outputs detail page 660 shows factor functions (i.e., key drivers) for the cloud readiness index 618 and for the cloud benefit index 620. Examples of the factor functions for the cloud readiness index 618 include, but are not limited to, architecture feasibility 670, OS/platform popularity 672 and application complexity 674. Examples of the factor functions for the cloud benefit index 620 include, but are not limited to, TCO (total cost of ownership) savings 676, application performance 678 and network performance 674.

Still referring to FIG. 16, it can be seen that the cloud readiness index 618 and the cloud benefit index 620 each include a respective theoretical index 680 and a respective practical adjustment 682. The cloud readiness index 618 and the cloud benefit index 620 are each the sum of their respective theoretical index 680 and respective practical adjustment 682. As discussed below in greater detail, the theoretical index is a value computed using responses to the information requests in association with the assessment category tabs 604-612 of the application screener 600 (see FIGS. 11-14) and the practical adjustment is a value determined by quantifying actual deployment results for one or more applications with respect to a respective set of the factor functions 670-680 and comparing to the associated theoretical index. In this regard, assessment functionality of the application screener 600 has a feedback input that adjusts for differences between theoretical assessment of an application deployment in a cloud and actual cloud deployment of assessed applications in accordance with their respective assessment (i.e., the benefit, readiness and/or deployment infrastructure corresponding to actual successful cloud deployment of one or more previously assessed applications).

Figure 17:
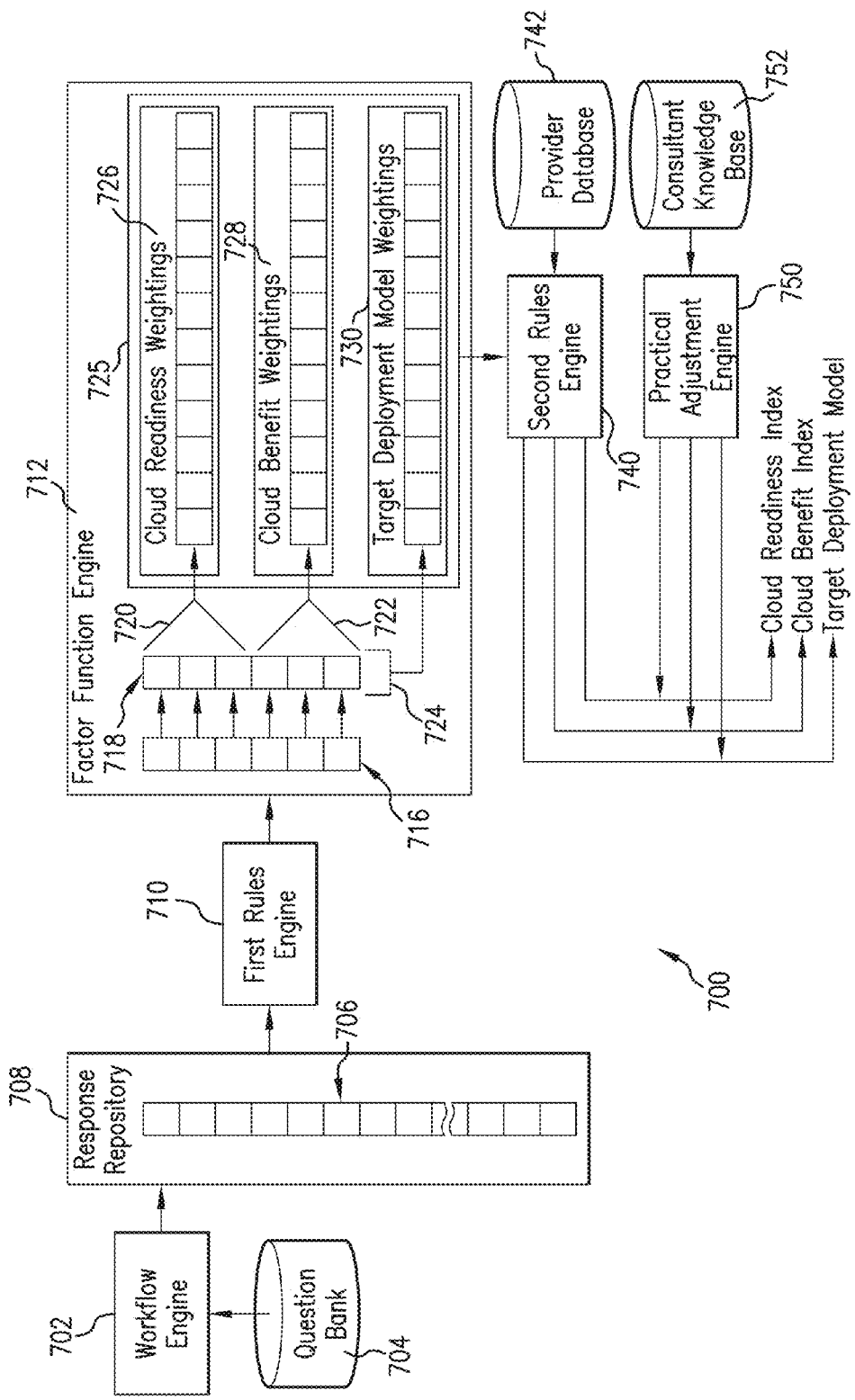
FIG. 17 is a diagrammatic view showing an abstraction of logic configured in accordance with an embodiment of the present invention for performing application screening.

Referring now to FIG. 17, an abstraction of logic configured in accordance with an embodiment of the present invention for performing application screening is disclosed (i.e., the application screening logic abstraction 700). A workflow engine 702 is provided for carrying out application assessment, which in one embodiment comprises the information requests and corresponding requests disclosed above in reference to FIGS. 11-14 or other embodiments of application screening functionality disclosed herein. The workflow engine 202 can choose the information requests in the form of questions from a question bank 704 (e.g., a database or other form of information storage structure). Responses to the information requests (i.e., responses 706) are stored in a response repository 708 that is coupled between the workflow engine 702 and a first rules engine 710. Preferably, the workflow engine causes each one of the responses 706 to be stored in the response repository 708 as a numeric value regardless of the form in which the response was indicated. Examples of forms that responses can be indicated include, but are not limited to, qualitative (e.g., answer="yes"), numeric (e.g., answer="4"), and descriptive (e.g., answer=mainframe). In this regard, the workflow engine would convert qualitative responses and descriptive responses to respective corresponding numeric responses (e.g., "yes"=1, "no"=0, "mainframe"=1, "client-server"=2, etc). The first rules engine 710 is configured for causing a plurality of non-normalized factor function values 714 to be created from respective sets of the responses 706 such as through an algorithm that uses weightings, arithmetic equations, and the like to generate a single resulting numeric value from the numeric values of a set of responses. Through a respective normalizing process 716, the non-normalized factor function values 714 are transitioned to corresponding normalized factor function values 718 such as, for example, a percentage (i.e., the normalization process causes the non-normalized numeric factor function value to be represented as a percentage of the possible range of numeric values of the factor function (e.g., 10% represents a non-normalized numeric value of 0-100 and 100% represents a non-normalized numeric value of 900-1000).

It is disclosed herein that normalization of the factor function value is performed for converting the factor function values into a normalized value so that weights can be applied in a meaningful manner. The process of normalization can includes applying the correct sign (e.g., to show if higher or lower is better), lower limits, upper limits, and a predefined growth curve. As the user provides different answers to the information requests, a respective factor function value would be normalized and scaled up or down as appropriate (i.e., the theoretical output).

A first set 720 of the factor functions are cloud readiness index determining factor functions (e.g., architecture feasibility, OS/platform popularity, and application complexity) and a second set 722 of the factor functions are cloud benefit index determining factor functions (e.g., TCO savings, application performance, and network performance). All of the factor functions are available as target deployment infrastructure determining factor functions 724. In this regard, the sets of factor functions 720-724 are used for generating application assessment results discussed above with respect to FIG. 11-16 (i.e., the readiness index 618, the benefit index 620, and the target deployment model 622). To allow for user-specific importance of responses used in computing the factor functions to be taken into account during computation of the application assessment results, the factor function engine includes factor function output portion 725 for enabling weighting structures 726-730 to be applied on a per-response and/or per rule basis for each of the sets of factor functions 720-724. In one embodiment, each one of the weighting structures 726-730 is associated with a respective set of the factor functions 720-724 and each one of the weighting structures 726-730 includes a plurality of weightings that are each applied to a response used in deriving one or more factor functions of the respective set associated therewith.

A second rules engine 740 is coupled to the factor function output portion 725 for receiving factor function information (e.g., indexes, weightings, and associated information) from the factor function engine 712. The second rules engine 740 is configured for generating the theoretical results outputs (e.g., theoretical readiness index, theoretical benefit index and theoretical target deployment model). For example, through information that is known about cloud service offerings of certain cloud service providers, which can be accessed from a provider database 742, the theoretical results outputs can be generated (e.g., knowing that a certain offering from provider X meets the requirements of a given assessed application and that that offering is a IaaS offering, the target deployment model would be determined to be IaaS).

As disclosed above in reference to FIG. 15, an application screener configured in accordance with the present invention can implement a practical adjustment with respect to theoretical outputs. The objective of the practical adjustment is to provide feedback input to the adjustment process to adjust for differences between theoretical assessment of an application deployment in a cloud and actual cloud deployment of assessed applications in accordance with their respective assessment. To this end, the application screening logic abstraction 700 can include a practical adjustment engine 750 that is coupled to the output of the rules engine 740. The practical adjustment engine 750 can be coupled to a data structure such as, for example, a consultant knowledge base 752 through which the practical adjustment engine 750 accesses information associated with actual cloud deployment of assessed applications in accordance with their respective assessment.

Figure 18:
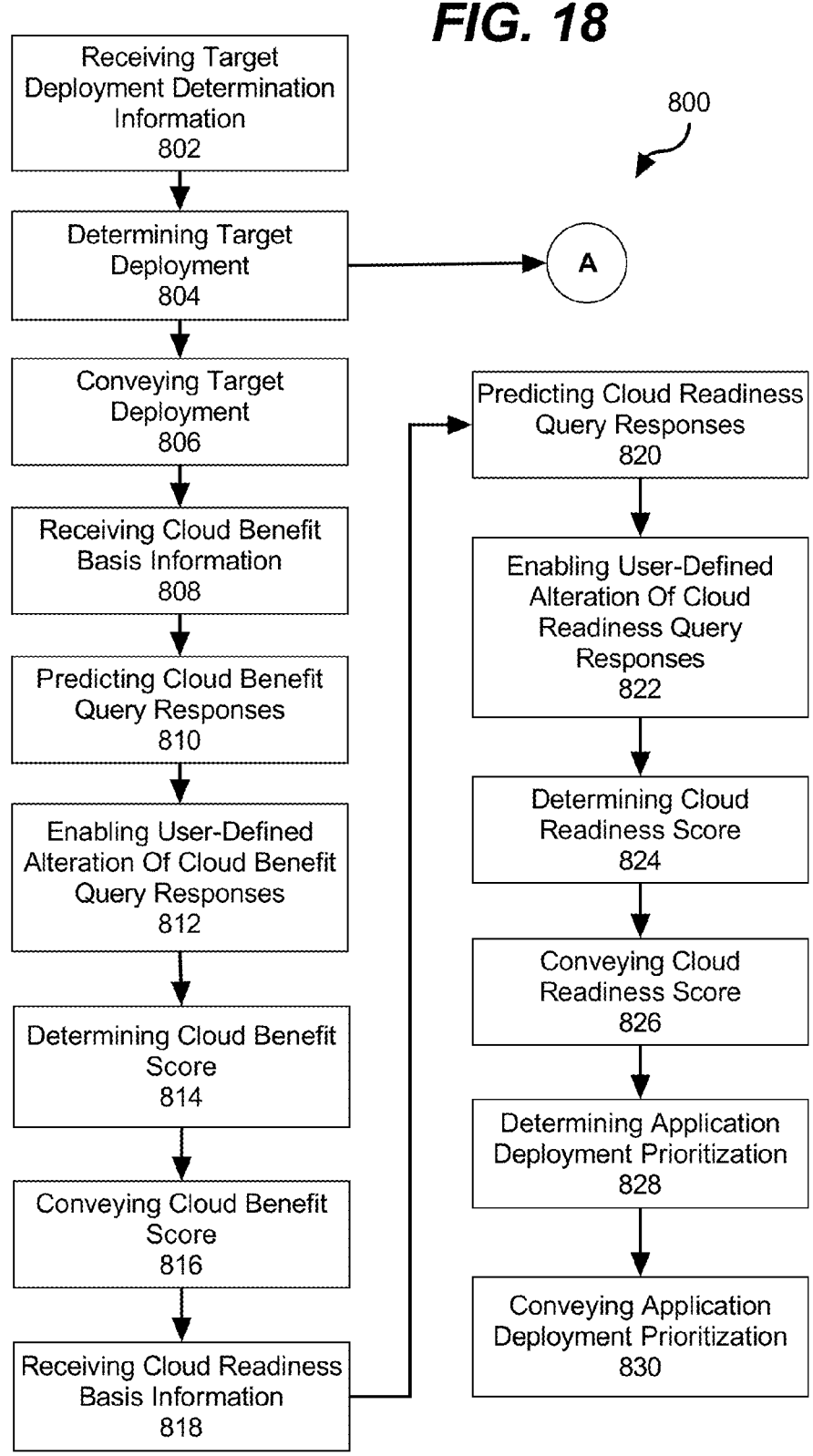
FIG. 18 is a flow diagram view of a process of implementing an application screening functionality in accordance with a third embodiment of the present invention.

Referring now to FIG. 18, a process 800 of implementing application screening functionality configured in accordance with a third embodiment of the present invention is shown. Specifically, FIG. 18 shows an embodiment of a process for assessing an application in regard to deployment within a cloud computing environment (i.e., a cloud environment). It is disclosed herein that the process 800 can be embodied as an application screener 800 and can include application screener functionality disclosed herein in reference to other embodiments of application screeners (e.g., the application screener 570 and/or the application screener 600). It is also disclosed herein that a CSB platform configured in accordance with an embodiment of the present invention can comprise the process 800 such as, for example, as implemented via an application screener integral therewith.

Advantageously, the process 800 uses predictive analytics for aiding a user in responding to application screening queries. More specifically, the process 800 uses basis information to select application screening queries (i.e., questions) and to provide predicted answers to such queries. To this end, the process 800 accesses a knowledge base and uses the basis information to identify relevant queries and to predict most likely responses to such queries. For example, for a plurality of relevant queries for a given assessment topic and each query having a plurality of selectable answers (i.e., responses), the process 800 uses the basis information to select a relevant subset of those queries and predicts answers to such queries. However, to ensure accuracy of assessment, predicted answers can be replaced with user-selected answers. In this respect, the burden on a user for answering each one of a large number of queries while still allowing a user to accurately reflect answers to queries by replacing predicted answers with user-selected answers.

Figure 19A:
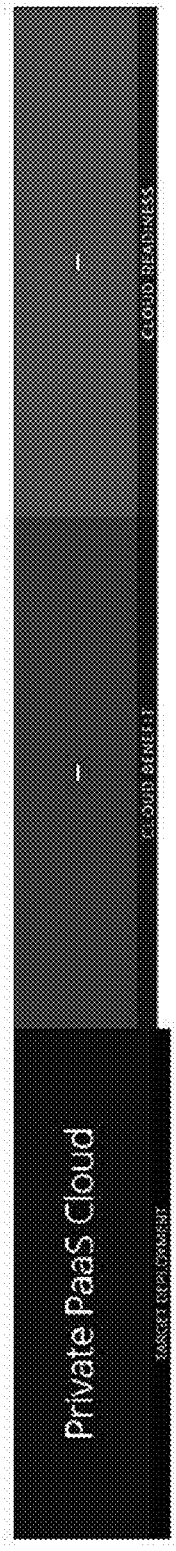
FIGS. 19A-19D are illustrative views showing various aspects of an application screener configured in accordance with the third embodiment of the present invention.

The process 800 begins with an operation 802 for receiving target deployment information, such as from a user of a CSB platform configured in accordance with the disclosures made herein. An operation 804 is performed for determining a target deployment environment for the application using the target deployment determination information. Upon fulfillment of responses to a number of target deployment determination queries, a corresponding target deployment environment is determined. Thereafter, an operation 806 is performed for conveying the target deployment environment. FIG. 19A shows a target deployment environment determination portion 902 of an application screener configured in accordance with the third embodiment of the present invention. The target deployment environment determination portion 902 is configured for enabling a user to provide responses to target deployment determination queries (i.e., target deployment basis information 904) that is used for determining a target deployment environment and is configured for enabling the target deployment environment 906 to be displayed after the target deployment environment is determined.

Determination of the target deployment environment is made using responses to a set of target deployment determination queries in which at least a portion of the questions are selected based on answers to answers for target deployment determination queries previously responded to in the assessment. Examples of target deployment options include, but are not limited to, a Physical Hardware environment, a Virtualized Hardware environment, a Private Infrastructure-as-a-Service (IaaS) cloud environment, a Virtual Private IaaS cloud environment, a Public IaaS cloud environment, a Private Platform-as-a-Service (PaaS) cloud environment, a Public PaaS cloud environment, a Private Software-as-a-Service (SaaS) cloud environment, and a public SaaS cloud environment. In this respect, the target deployment determination information is basis information for determination of a target deployment environment.

Figure 19B:
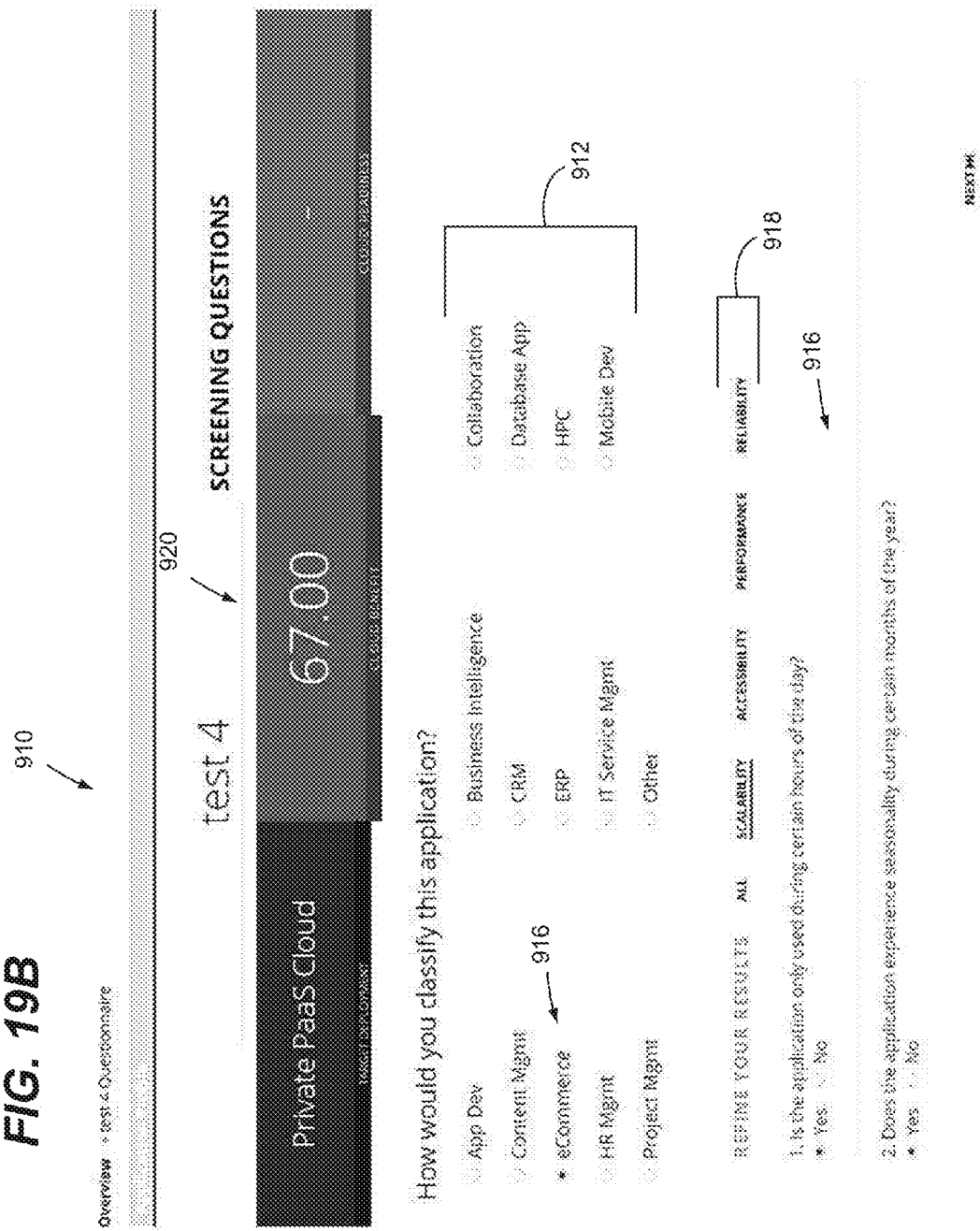

After conveying the target deployment environment, an operation 808 is performed for receiving cloud benefit basis information. In preferred embodiments, the cloud benefit basis information indicates a particular application classification (i.e., category) to which the application corresponds. Examples of such application classifications can include, but are not limited to, application development, business development, collaboration, content management, CRM (Customer Relationship Management), database application, ecommerce, ERP (Enterprise Resource Planning), HPC (High Performance Computing), HR management (Human Resource management), information technology service management, mobile development, project management, and the like. FIG. 19B shows a cloud benefit score determination portion 910 of the application screener configured in accordance with the third embodiment of the present invention an application. The cloud benefit score determination portion 910 is configured for displaying selectable application classifications 912 and for enabling a user to select a desired application classification (i.e., selected application classification 914).

After receiving the cloud benefit basis information, an operation 810 is performed for predicting responses to cloud benefit queries based upon the cloud benefit basis information. Examples of cloud benefit queries include, but are not limited to, queries characterizing scalability requirements, accessibility requirements, performance requirements, and reliability requirements of the application. Prediction of the cloud benefit query responses based upon the cloud benefit basis information involves accessing a knowledge base and using the cloud benefit basis information to identify relevant queries and to predict most likely responses to such queries. To ensure accuracy of assessment, an operation 812 is performed for enabling predicted responses to the cloud benefit queries can be replaced with user-selected responses (i.e., answers). The cloud benefit score determination portion 910 shown in FIG. 19B displays cloud benefit queries (e.g., a plurality of cloud benefit queries 916 corresponding to each one of a plurality of cloud benefit topics 918) and is configured for enabling predicted responses to each one of the cloud benefit queries to be replaced with user-selected responses.

In response to prediction of the cloud benefit query responses and any instance of a cloud benefit query response being replaced with a user-selected response, an operation 814 is performed for determining a cloud benefit score based upon the responses to the cloud benefit queries, followed by an operation 816 being performed for conveying the cloud benefit score. Determination of the cloud benefit score is discussed herein in greater detail in reference to FIG. 17. The cloud benefit score determination portion 910 shown in FIG. 19B is configured for displaying the cloud benefit score (i.e., displayed cloud benefit score 920, which changes accordingly as predicted responses to the cloud benefit queries can be replaced with user-selected responses and/or as responses are to provided to queries that do not have a predicted response.

Figure 19C:
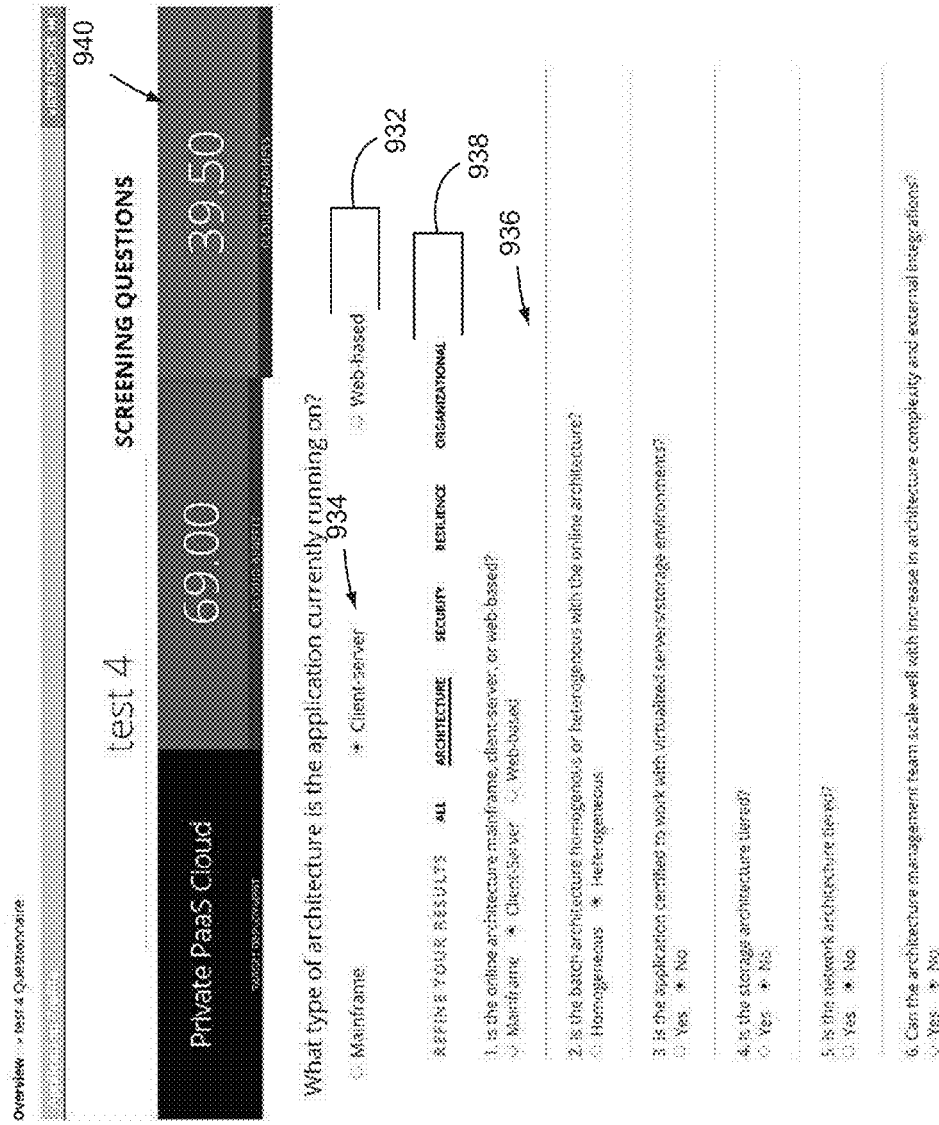

After finalizing responses to the cloud benefit queries, an operation 818 is performed for receiving cloud readiness basis information. In preferred embodiments, the cloud readiness basis information indicates a particular architecture type on which the application is currently running on and/or is designed to run on. Examples of such architecture types can include, but are not limited to, a mainframe architecture, a client-server architecture, and a web-based architecture. FIG. 19C shows a cloud readiness score determination portion 930 of the application screener configured in accordance with the third embodiment of the present invention an application. The cloud readiness score determination portion 930 is configured for displaying selectable architecture types 932 and for enabling a user to select a desired architecture type (i.e., selected architecture type 934).

After receiving the cloud readiness basis information, an operation 820 is performed for predicting responses to cloud readiness queries based upon the cloud readiness basis information. Examples of cloud readiness queries include, but are not limited to, queries characterizing architecture requirements, security requirements, resilience requirements, and organizational requirements of the application. Prediction of the cloud readiness query responses based upon the cloud readiness basis information involves accessing a knowledge base and using the cloud readiness basis information to identify relevant queries and to predict most likely responses to such queries. To ensure accuracy of assessment, an operation 822 is performed for enabling predicted responses to the cloud readiness queries can be replaced with user-selected responses (i.e., answers). The cloud readiness score determination portion 930 shown in FIG. 19C displays cloud readiness queries (e.g., a plurality of cloud readiness queries 936 corresponding to each one of a plurality of cloud readiness topics 938) and is configured for enabling predicted responses to each one of the cloud benefit queries to be replaced with user-selected responses.

In response to prediction of the cloud readiness query responses and any instance of a cloud readiness response being replaced with a user-selected response, an operation 824 is performed for determining a cloud readiness score based upon the responses to the cloud readiness queries, followed by an operation 826 being performed for conveying the cloud readiness score. Determination of the cloud readiness score is discussed herein in greater detail in reference to FIG. 17. The cloud readiness score determination portion 930 shown in FIG. 19C is configured for displaying the cloud readiness score (i.e., displayed cloud readiness score 940, which changes accordingly as predicted responses to the cloud readiness queries can be replaced with user-selected responses and/or as responses are to provided to queries that do not have a predicted response.

Figure 19D:
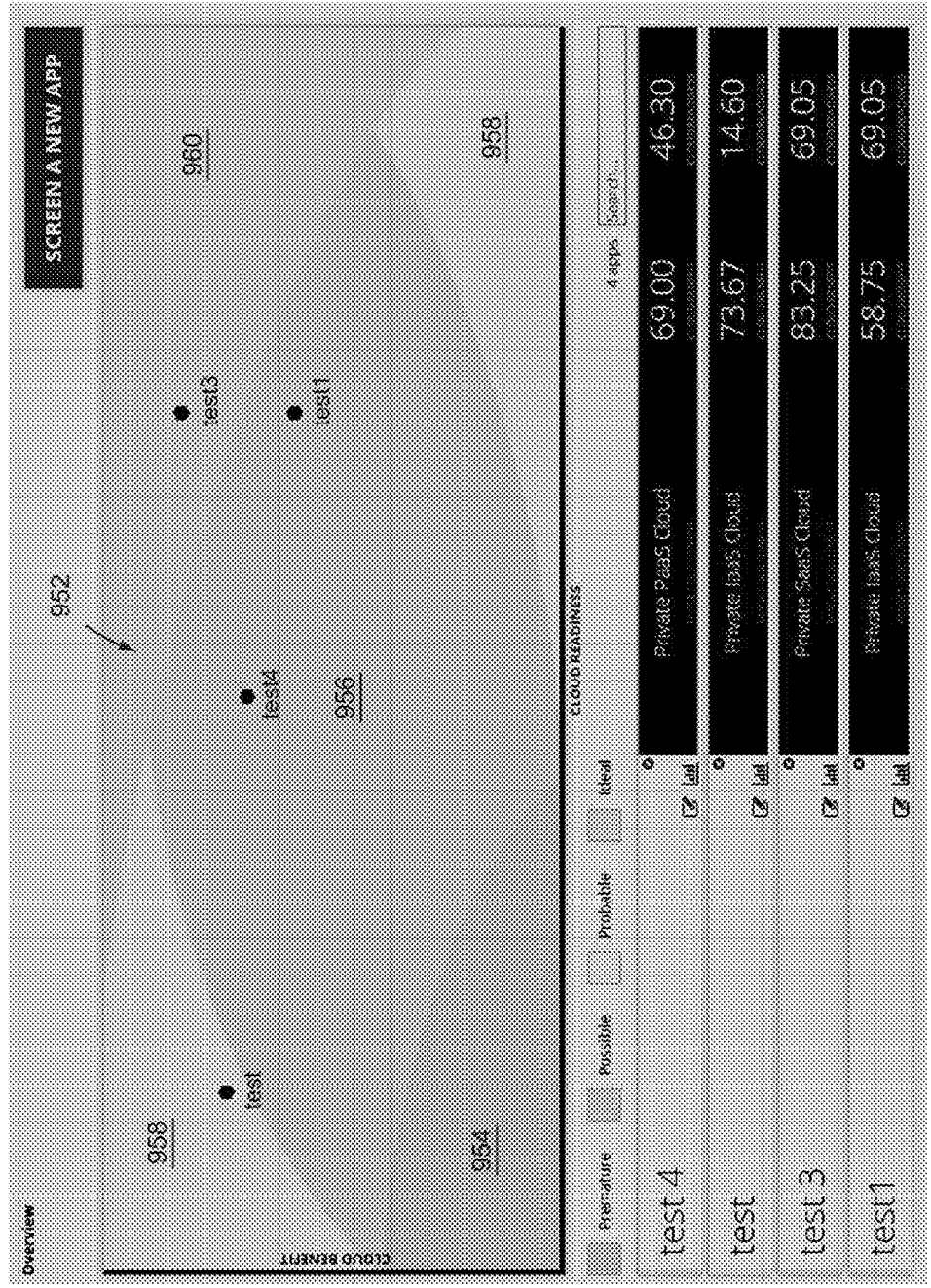

After determining the target deployment environment, cloud benefit score, and cloud readiness score (i.e., jointly referred to as the cloud deployment assessment metrics) for the application, an operation 828 is performed for determining an application deployment prioritization, followed by an operation for conveying the application deployment prioritization. Determination of the application deployment prioritization can include using all or a portion of the cloud deployment assessment metrics to identify a corresponding deployment prioritization. As shown in FIG. 19D, an application deployment prioritization portion 950 of the application screener configured in accordance with the third embodiment of the present invention an application includes a prioritization abstraction 952. The prioritization abstraction 952 includes prioritization regions each defines by relative ranges of cloud benefit score and cloud readiness score. Examples of such prioritization regions include a first prioritization region 954 indicating that it is premature to deploy a particular application in a respective cloud computing environment (i.e., relatively low cloud benefit and relatively low cloud readiness), a second prioritization region 956 indicating that it is possible to deploy a particular application in a respective cloud computing environment (i.e., moderate to relatively high cloud benefit and/or moderate to relatively high cloud readiness), a third prioritization region 958 indicating that it is probable to deploy a particular application in a respective cloud computing environment (i.e., moderate to relatively high cloud benefit or moderate to relatively high cloud readiness), and a fourth prioritization region 960 indicating that it is ideal to deploy a particular application in a respective cloud computing environment (i.e., relatively high cloud benefit and relatively high cloud readiness).

Cloud Resource Comparison and Procurement Functionality

Figure 20:
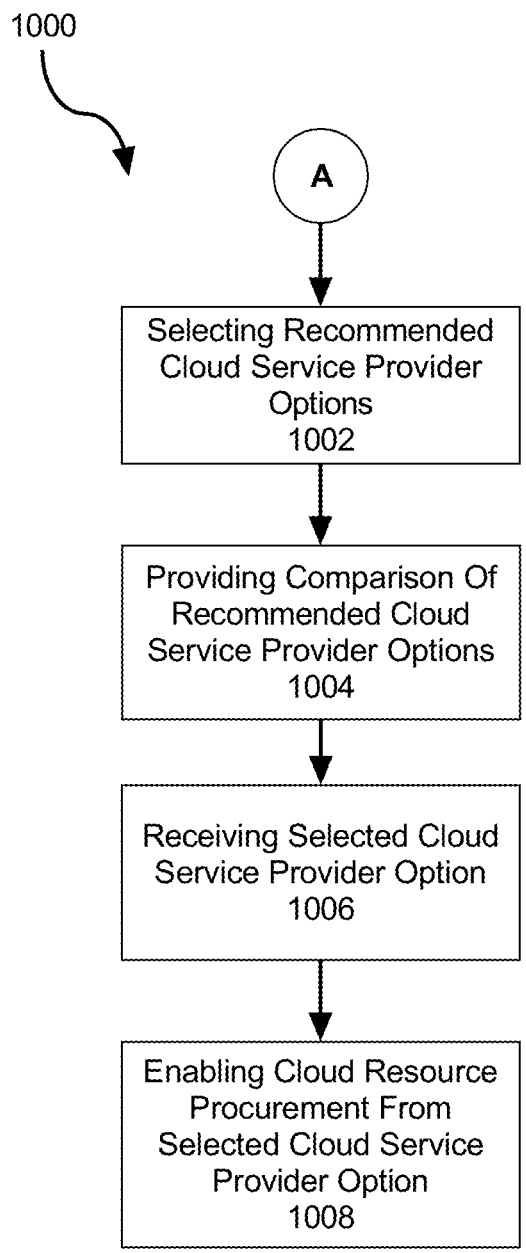
FIG. 20 is a flow diagram view showing a process for using a target deployment environment of an application as a basis for comparison and procurement of cloud resources for that application.

It is disclosed herein that information generated during screening of an application can advantageously be used in the comparison and procurement of cloud resource for that application. FIG. 20 shows an embodiment of a process 1000 for using the target deployment environment of the application as a basis for comparison and procurement of cloud resources for that application. It is also disclosed herein that a CSB platform configured in accordance with an embodiment of the present invention can comprise the process 1000.

The process 1000 begins with an operation 1002 for selecting recommended cloud service provider options based on the target deployment environment of the application. An operation 1004 is then performed for providing a comparison of the recommended cloud service provider options. Such selection and comparison of recommended cloud service provider options is discussed herein in greater detail in reference to FIGS. 8A, 8B, and 9. In response to an operation 1006 being perfumed for receiving a selected cloud service provider option from a user, and operation 1008 is performed for enabling cloud resource procurement from the selected cloud service provider option as discussed herein in reference to FIG. 3A.

DETAILED DESCRIPTION SUMMARY

In view of the foregoing disclosures, a skilled person will appreciate that embodiments of the present invention offer several beneficial considerations. One such consideration is enabling PaaS for enabling true IaaS for end customers in addition to IaaS for enterprise IT. Another such consideration is the ability to shift a private cloud from to a fulfillment model of service to end customers (business units and application teams) to a self-service model offering design, order, fulfillment and control. Another such consideration is enabling IT as a private cloud provider to publish private cloud into a cloud service model for self-service consumption and equal footing with public cloud services thereby allowing enterprise IT to compete in a healthy way with public clouds and provide best value to their costumers (e.g., business units, application teams and the like). Another such consideration is normalization of services and functionalities across disparate public cloud service models (e.g., reserved capacity, pay-as-you-go, reserved instances, memory based pricing, VM based pricing, etc.) and private cloud models for enabling 'apples-to-apples' comparison and best-fit determination. Another such consideration is an ability to graphically design, view and maintain a truly hybrid and dynamic changing cloud solution. Another such consideration is an ability for cloud solution architects, IT administrators, procurement managers, application developers, IT managers, and other constituents to collaborate and manage cloud based solutions across IaaS, PaaS, SaaS, Managed Services and other categories of cloud services through a scenarios concept (e.g., solution or application design).

Although the invention has been described with reference to several exemplary embodiments, it is understood that the words that have been used are words of description and illustration, rather than words of limitation. Changes may be made within the purview of claims supported by the disclosures made herein, without departing from the scope and spirit of the invention in all its aspects. Although the invention has been described with reference to particular means, materials and embodiments, the invention is not intended to be limited to the particulars disclosed; rather, the invention extends to all functionally equivalent technologies, structures, methods and uses such as are within the scope of the claims supported by the disclosures made herein.

What is claimed is:

1. A process implemented by a cloud service brokerage platform, comprising:
instantiating an instance of a service provider application programming interface (API) for each one of a plurality of cloud service providers;
receiving, via the service provider API, deployment characterizing information for a plurality of information technology applications that have each been previously deployed using cloud services of at least one of the cloud service providers;
determining a target cloud computing environment for an application using target deployment determination information received from a user of the cloud service brokerage platform;
determining a cloud benefit score characterizing a degree of benefit from deploying the application in the target cloud computing environment, wherein determining the cloud benefit score includes using cloud benefit basis information received from the user to predict responses to cloud benefit queries and enabling the user to replace at least a portion of said predicted cloud benefit query responses with user-specified cloud benefit query responses thereby creating a set of cloud benefit query responses, wherein determining the cloud benefit score includes deriving a value that quantitatively characterizes a respective one of a set of cloud benefit factor functions, wherein the value of each one of the cloud benefit factor functions is derived as a function of a respective set of the cloud benefit query responses, wherein determining the cloud benefit score includes computing a cloud benefit theoretical index as a function of the cloud benefit factor function values derived from the set of cloud benefit factor functions and cloud benefit factor function weightings associated therewith, wherein computing the cloud benefit theoretical index includes applying the cloud benefit factor function weightings to respective ones of the cloud benefit query responses for causing user-specific importance of one or more of the cloud benefit query responses to be reflected on a per-response basis in said determination of the cloud benefit score, wherein determining the cloud benefit score includes deriving a cloud benefit practical adjustment value as a function of the deployment characterizing information and applying the cloud benefit practical adjustment value to the cloud benefit theoretical index to adjust for deployment considerations identified through deployment of said previously deployed information technology applications;
determining a cloud readiness score characterizing a degree of readiness for deploying the application in the target cloud computing environment, wherein determining the cloud readiness score includes using cloud readiness basis information received from the user to predict responses to cloud readiness queries and enabling the user to replace at least a portion of said predicted cloud readiness query responses with user-specified cloud readiness query responses thereby creating a set of cloud readiness query responses, wherein determining the cloud readiness score includes deriving a value that quantitatively characterizes a respective one of a set of cloud readiness factor functions, wherein the value of each one of the cloud readiness factor functions is derived as a function of a respective set of the cloud readiness query responses, wherein determining the cloud readiness score includes computing a cloud readiness theoretical index as a function of the cloud readiness factor function values derived from the set of cloud readiness factor functions and cloud readiness factor function weightings associated therewith, wherein computing the cloud readiness theoretical index includes applying the cloud readiness factor function weightings to respective ones of the cloud readiness query responses for causing user-specific importance of one or more of the cloud readiness query responses to be reflected on a per-response basis in said determination of the cloud readiness score, wherein determining the cloud readiness score includes deriving a cloud readiness practical adjustment value as a function of the deployment characterizing information and applying the cloud readiness practical adjustment value to the cloud readiness theoretical index to adjust for deployment considerations identified through deployment of said previously deployed information technology applications; and
conveying the target cloud computing environment, the cloud benefit score and the cloud readiness score to the user.

2. The process of claim 1 wherein:
using the cloud benefit basis information to predict responses to cloud benefit queries includes correlating the cloud benefit basis information to responses to cloud benefit queries for at least one other application determined to be of the same application classification as the application; and
using the cloud readiness basis information to predict responses to cloud readiness queries includes correlating the cloud readiness basis information to responses to cloud readiness queries for at least one other application determined to at least one be currently running on and being designed to run on the same architecture type as the application.

3. The process of claim 1 wherein:
enabling the user to replace at least a portion of said predicted cloud benefit query responses with user-specified cloud benefit query responses includes displaying a plurality of cloud benefit queries each having a respective one of said predicted cloud benefit query responses displayed therewith and displaying one or more other available cloud benefit query responses in association with each one of the cloud benefit queries; and
enabling the user to replace at least a portion of said predicted cloud readiness query responses with user-specified cloud readiness query responses includes displaying a plurality of cloud benefit queries each having a respective one of said predicted cloud readiness query responses displayed therewith and displaying one or more other available cloud readiness query responses in association with each one of the cloud readiness queries.

4. The process of claim 3 wherein:
the cloud benefit basis information indicates a particular application classification to which the application corresponds; and
the cloud readiness basis information indicates a particular architecture type on which the application is at least one of currently running on and designed to run on.

5. The process of claim 1 wherein conveying the target cloud computing environment, the cloud benefit score and the cloud readiness score includes:
displaying the target cloud computing environment immediately in response to its determination;

displaying the cloud benefit score immediately in response to its determination; and displaying the cloud readiness score immediately in response to its determination.

6. The process of claim 1 wherein:

enabling the user to replace at least a portion of said predicted cloud benefit query responses with user-specified cloud benefit query responses includes enabling the user to provide user-specified cloud benefit query responses characterizing scalability requirements, accessibility requirements, performance requirements, and reliability requirements of the application;

enabling the user to replace at least a portion of said predicted cloud readiness query responses with user-specified cloud readiness query responses includes enabling the user to provide user-specified cloud readiness query responses characterizing architecture requirements, security requirements, resilience requirements, and organizational requirements of the application.

7. The process of claim 1 wherein determining the target cloud computing environment is performed prior to either one of determining the cloud benefit score and determining the cloud readiness score.

8. The process of claim 1 wherein:

the cloud benefit basis information indicates a particular application classification to which the application corresponds; and the cloud readiness basis information indicates a particular architecture type on which the application is at least one of currently running on and designed to run on.

9. The process of claim 8 wherein:

using the cloud benefit basis information to predict responses to cloud benefit queries includes correlating the cloud benefit basis information to responses to cloud benefit query responses for at least one other application determined to be of the particular application classification; and using the cloud readiness basis information to predict responses to cloud readiness queries includes correlating the cloud readiness basis information to responses to cloud readiness query responses for at least one other application determined to at least one be currently running on and being designed to run on the particular architecture type.

10. A process implemented by a cloud service brokerage platform, comprising:

assessing target deployment determination information of an application to determine a target deployment environment for the application;

instantiating an instance of a service provider application programming interface (API) for each one of a plurality of cloud service providers;

receiving, via the service provider API, deployment characterizing information for a plurality of information technology applications that have each been previously deployed within the target deployment environment using cloud services of at least one of the cloud service providers;

in response to said assessing of the target deployment determination information resulting in a determination that the target deployment environment is a cloud computing target deployment environment, receiving cloud deployment basis information for the application;

determining information characterizing a degree of benefit from deploying the application in the target deployment environment and a degree of readiness for deploying the application in the cloud computing environment, wherein determining said benefit and readiness characterizing information includes using the cloud deployment basis information to predict responses to queries defining benefit from deploying the application in the cloud computing target deployment environment and to predict responses to queries defining readiness for deploying the application in the cloud computing target deployment environment, wherein said benefit characterizing information and readiness characterizing information respectively includes a cloud benefit score and a cloud readiness score, wherein determining said benefit and readiness characterizing information includes determining each one of a cloud benefit theoretical index and a cloud readiness theoretical index, deriving a cloud benefit practical adjustment value and a cloud readiness practical adjustment value each as a function of the deployment characterizing information and applying each one of said practical adjustment values to the corresponding one of said theoretical indices to adjust for deployment considerations identified through deployment of the previously deployed information technology applications, wherein the cloud benefit theoretical index is determined as a function of cloud benefit factor function values derived from a set of cloud benefit factor functions and cloud benefit factor function weightings associated therewith and wherein the cloud readiness theoretical index is determined as a function of cloud readiness factor function values derived from a set of cloud readiness factor functions and cloud readiness factor function weightings associated therewith.

11. The process of claim 10 wherein assessing the target deployment determination information to determine the target deployment environment for the application results in determination of one of a physical hardware target deployment environment, a virtualized hardware target deployment environment, and a cloud computing target deployment environment.

12. The process of claim 10 wherein:

using the cloud deployment basis information to predict responses to queries defining benefit from deploying the application in the cloud computing target deployment environment includes correlating at least a portion of the cloud deployment basis information to responses to cloud benefit queries for at least one other application determined to be of the same application classification as the application; and using the cloud readiness basis information to predict responses to cloud readiness queries includes correlating at least a portion of the cloud deployment basis information to responses to cloud readiness queries for at least one other application determined to at least one be currently running on and being designed to run on the same architecture type as the application.

13. The process of claim 10, further comprising:

enabling a user of the cloud service brokerage platform to replace at least a portion of said predicted cloud benefit query responses with user-specified cloud benefit query responses; and enabling the user of the cloud service brokerage platform to replace at least a portion of said predicted cloud readiness query responses with user-specified cloud readiness query responses.

14. The process of claim 13 wherein:
enabling user of the cloud service brokerage platform to replace at least a portion of said predicted cloud benefit query responses with user-specified cloud benefit query responses includes enabling the user to provide user-specified cloud benefit query responses characterizing scalability requirements, accessibility requirements, performance requirements, and reliability requirements of the application;
enabling user of the cloud service brokerage platform to replace at least a portion of said predicted cloud readiness query responses with user-specified cloud readiness query responses includes enabling the user to provide user-specified cloud readiness query responses characterizing architecture requirements, security requirements, resilience requirements, and organizational requirements of the application.

15. The process of claim 10 wherein:
the cloud deployment basis information includes a portion indicating a particular application classification to which the application corresponds; and
the cloud readiness basis information includes a portion indicating a particular architecture type on which the application is at least one of currently running on and designed to run on.

16. The process of claim 10, further comprising:
conveying the target deployment environment target cloud computing environment, the information characterizing the degree of benefit from deploying the application in the target deployment environment and the information characterizing the degree of readiness for deploying the application in the cloud computing environment to a user of the cloud service brokerage platform;
wherein conveying the target deployment environment target cloud computing environment includes displaying the target cloud computing environment immediately in response to its determination;
wherein conveying the information characterizing the degree of benefit from deploying the application in the target deployment environment includes displaying the cloud benefit score immediately in response to its determination; and
wherein conveying the information characterizing the degree of readiness for deploying the application in the cloud computing environment includes displaying the cloud readiness score immediately in response to its determination.

* * * * *